United States Patent
Chang et al.

(10) Patent No.: US 11,887,575 B2
(45) Date of Patent: *Jan. 30, 2024

(54) GENERATING ACOUSTIC QUIET ZONE BY NOISE INJECTION TECHNIQUES

(71) Applicant: SPATIAL DIGITAL SYSTEMS, INC., Agoura Hills, CA (US)

(72) Inventors: Donald C. D. Chang, Thousand Oaks, CA (US); Steve K. Chen, Pacific Palisades, CA (US)

(73) Assignee: SPATIAL DIGITAL SYSTEMS, INC.

( * ) Notice: Subject to any disclaimer, the term of this patent is extended or adjusted under 35 U.S.C. 154(b) by 0 days.

This patent is subject to a terminal disclaimer.

(21) Appl. No.: 16/006,695

(22) Filed: Jun. 12, 2018

(65) Prior Publication Data
US 2018/0292539 A1    Oct. 11, 2018

Related U.S. Application Data

(63) Continuation of application No. 13/008,833, filed on Jan. 18, 2011, now Pat. No. 9,995,828.

(51) Int. Cl.
*G10K 11/178* (2006.01)
*G01S 19/21* (2010.01)
*G10K 11/34* (2006.01)

(52) U.S. Cl.
CPC ...... *G10K 11/17857* (2018.01); *G01S 19/215* (2013.01); *G10K 11/34* (2013.01);
(Continued)

(58) Field of Classification Search
CPC .. G10K 11/178; G10K 2210/12; G10K 11/34; G10K 11/341; G10K 2210/128; G10K 2210/3215; G10S 19/215
See application file for complete search history.

(56) References Cited

U.S. PATENT DOCUMENTS

| | | | | |
|---|---|---|---|---|
| 5,699,437 A | * | 12/1997 | Finn | G10K 11/17857 381/71.7 |
| 7,577,260 B1 | * | 8/2009 | Hooley | F41H 13/0081 381/307 |

(Continued)

OTHER PUBLICATIONS

Tu ; Multiple references active noise control, IEEE (Year: 1997).*

*Primary Examiner* — Carolyn R Edwards
*Assistant Examiner* — Kuassi A Ganmavo
(74) *Attorney, Agent, or Firm* — Phuong-Quan Hoang

(57) ABSTRACT

A system for generating and injecting acoustic interference signals to mitigate undesired acoustic noise over a target zone. M pickup sensors pick up acoustic noise signals from one or more noise sources in real time and generate M noise signals, M>1. A beam forming network includes M acoustic beam forming modules to process the M noise signals respectively and generate N acoustic interference signals. N acoustic injectors condition, amplify and inject the N acoustic interference signals over the target zone, N>1. Each of the M acoustic beam forming modules includes a 1-to-N distribution network to transform a respective one of the M noise signals into N signals, and N finite-impulse-response filters to perform amplitude and phase weighting on the respective N signals and generate N intermediate signals which are combined respectively with corresponding intermediate signals generated by remaining M−1 acoustic beam forming modules to generate the N acoustic interference signals.

20 Claims, 11 Drawing Sheets

(52) U.S. Cl.
CPC ........ *G10K 11/341* (2013.01); *G10K 2210/12* (2013.01); *G10K 2210/128* (2013.01); *G10K 2210/3215* (2013.01)

(56) References Cited

U.S. PATENT DOCUMENTS

| | | | | |
|---|---|---|---|---|
| 2004/0021350 | A1* | 2/2004 | House | A47C 7/72 297/217.4 |
| 2004/0234080 | A1* | 11/2004 | Hernandez | G10K 11/178 381/71.11 |
| 2007/0297620 | A1* | 12/2007 | Choy | G10K 11/178 381/73.1 |
| 2008/0199024 | A1* | 8/2008 | Nakadai | H04R 3/005 381/92 |
| 2019/0028803 | A1* | 1/2019 | Benattar | H04S 7/304 |

* cited by examiner

Noise flux density over the quiet zone before and after the optimization processing

GENERATING ACOUSTIC QUIET ZONE BY NOISE INJECTION TECHNIQUES

RELATED APPLICATION DATA

This application is a continuation of application Ser. No. 13/008,833, filed on Jan. 18, 2011.

BACKGROUND OF THE INVENTION

1. Field of the Invention

The present invention relates to architectures and designs of mitigation techniques for undesired acoustic noises. In particular, the present invention pertains to acoustic devices generating acoustic signal quiet zones for undesired noise mitigation, while simultaneously retaining desired acoustic signals at acceptable levels.

Several possible applications include, but are not limited to: 1) mitigation or elimination of road noise for in-car audio applications, 2) mitigation or elimination of engine noise for aeronautical applications, such as creation of individual quiet zones for passenger planes 3) mitigation of loud noises in enclosed areas such as cancellation of snoring in a bedroom, and 4) creation mobile quiet zones, such as for music event type applications in relation to sound checking and engineering.

2. Description of Related Art

Acoustic interference is a phenomenon that is so prevalent in our current society that it is notoriously difficult to avoid. Whether it be road noise being transmitted through a car frame to the car cabin, or noise generated by construction equipment, undesired noises permeate many facets of everyday life. By definition, acoustic interference, which are undesired acoustic signals (sound), originates from a source external to a desired signal path and produces undesired artifacts in the desired signal. The interfering signals in acoustic wave mode are referred as acoustic noises.

Acoustic interference may be the source of many problems associated with sound in our society today. Excessive amounts of noise can pose a health risk for the majority of the population, as hearing loss is a major concern. Excessive waste noise also causes problems, as it may devalue property (such as a house living near a railroad), make the area uncomfortable, among other things. Additionally, some noises may just be uncomfortable or undesirable, such as the snores of a partner, or the road noise within a car. Thus, there has been a need to find ways of mitigating such noise to improve many facets of our lives.

With our current technologies, the only viable solution to getting rid of these undesired noises without eliminating necessary acoustic signals (such as people's voices) has been to use noise cancelling technology. One of the best manifestations of this noise cancelling technology is Active Noise Control, or ANC. ANC involves using several microphones to generate a "noise signal," which is then used to cancel out the undesired noises by playing the same signal back in inverted phases. There are three particular manifestations utilizing ANC which will be examined: noise cancelling headphones, ANC for automobiles, and audio feedback elimination.

Noise-Canceling Headphones

Noise cancellation headphones are one of the more obvious and transparent uses of this technology. These types of headphones make it possible for people to enjoy music without raising the volume excessively if there is too much acoustic interference. Noise-canceling headphones reduce unwanted ambient sounds (i.e., acoustic noise) by means of active noise control (ANC). This involves using one or more microphones placed near the ear, and electronic circuitry which uses the microphone signal to generate a "noise" signal with inverted phases. When the phase-inverted noise is produced by the speaker driver in the headphone, destructive interference cancels out the ambient noise as heard within the enclosed volume of the headphone.

Retail noise-cancelling headphones typically use ANC to cancel the lower-frequency portions of the noise; they depend on more traditional methods such as soundproofing to prevent higher-frequency noise from reaching the ear.

This approach is preferred because it reduces the demand for complicated electronic circuitry and at higher frequencies, where active cancellation is less effective. To truly cancel high frequency components (coming at the ear from all directions), the sensor and emitter for the canceling waveform would have to be adjacent to the user's eardrum, which is not technically feasible.

Noise-cancelling aviation headsets, typically circumaural headphones that enclose the wearer's ears completely, are also commonly available. This provides passive noise isolation so that electronic noise cancellation circuitry can perform better. Noise-canceling headphones have several limitations (that vary from vendor to vendor):

1. They work well for sounds that are continuous, such as the hum of a refrigerator or the sound in an airplane cabin, but are rather ineffective against speech or other rapidly changing audio signals.

2. They may introduce additional noise, usually in the form of high-frequency hiss.

3. They consume power, supplied by a USB port or a battery.

Bose® has continuously improved the technology since then. Bose® QuietComfort® 15 headphones reduce even more noise across the full spectrum of human hearing by advanced electronics with micro-phones both inside and outside each ear-cup to sense and reduce more of the sounds around a passenger. The advanced headphones feature less outside noise than ever before, and deliver better quality audio. This approach is preferred because it reduces the demand for complicated electronic circuitry and at higher frequencies, where active cancellation is less effective. However, like their previous incarnations, the headphones still have an issue with cancelling out high frequency, omnidirectional noise components. These headphones generally only cancel out constant, non-dynamic noise, and only up to 26 dB in power. The sensor and emitter for the canceling waveform have to be strategically and dynamically placed. Thus, these headphones still falter as they do not have a truly dynamic noise cancelling capability.

Active Noise Cancellation for Car

Honda is using noise-cancellation technology in their high-end cars. The way it works is that a microphone connected to the car stereo system picks up all the sound inside the car, including music or such from the stereo. Then the noise-cancellation system subtracts the sound of the music coming from the stereo and produces noise-canceling sound waves that match the frequency of unwanted sound. The noise-canceling sound waves are also sent through the stereo speakers, along with the music. This technique greatly reduces the low frequency vibration noises in the car, without dampening the car's audio system. The system uses a microphone to hear what the driver and passengers hear, analyzes it with an onboard computer, and pipes out a cancelling sound via the stereo system.

Toyota in 2008 deployed a noise cancelling system for its Japanese-market Crown Hybrid that nearly eliminated engine sound within the passenger compartment. The system uses a complex system of microphones, speakers and sensors located around the cabin.

Like the headphones, the Toyota system works by using small microphones to monitor surrounding sounds, then plays back frequencies mathematically calculated to be the exact opposite of the ambient noise through the speakers, causing both sound waves to collide and cancel each other out. The Toyota system has an extra sensor that takes into account engine rpm.

Toyota has worked internal noise-canceling into its new Crown Hybrid, with microphones to pick up engine and road noise, and then speakers to blast out anti-phase versions of those noises at head height. Toyota claims it can cut noise by around 5 to 8 dB.

Audio Feedback Elimination

Audio feedback is the ringing noise caused by a "looped signal", that is, a signal which travels in a continuous loop; caused by interactions between microphones and speakers—a microphone feeds a signal into a sound system, which then amplifies and outputs the signal from a speaker, which is picked up again by the microphone. The feedback occurs when the gain in the signal loop reaches "unity" (0 dB gain).

There are many situations which result in feedback; such as the pickups of an electric guitar and speakers. To eliminate audio feedback, the feedback loop must be interrupted. There are many methods for controlling feedback, such as use of a more directional microphone, lowering the speaker output so that the microphone does not pick it up, speaking (or singing) close to the microphone, or positioning the microphone and/or speaker to minimize direct feeding of speaker output into the mic. However, these solutions are impractical. It either involves limiting the potential of the equipment, or physically changing the nature of the sound just to avoid feedback.

Spatial Digital Systems, Inc. had a patent filed for electromagnetic (EM) interference mitigation architectures in free space over a finite area, referred to as a quiet zone. The architectures consist of RF antenna geometries, and optimization processing. The RF antenna geometries must provide the following three functions: (1) directional and high-fidelity pick-up of interference signals, (2) distributed emitters (array elements of an injection array), and (3) multiple sensors (probes in a quiet zone). Simulated results in FIG. 7 indicate the invented techniques work extremely well for directional interferences or localized strong RF jamming sources. The optimization processes are programmed for significant reduction of strong interference distributed over a selected quiet zone; an entire area, not for deep cancellations for a few spots. The mitigation architectures and techniques enable the wave propagation phenomena of continuous and effective destructive interference among multiple wavefronts over the quiet zone by precision injections of the interference signals themselves. The precision injections are through an injection array with distributed elements strategically located (physically or functionally equivalent) very close to the quiet zone.

This filing aims to take the principles of RF quiet zone generation and apply it to creating acoustic quiet zones. Audio quiet zone generation via the injection—for cancellation technique of this invention appears to be a viable and effective means to eliminate the audio feed back. The audio quiet zones are generated by precision controls on the amplitudes and phase weightings on the frequency components of signals radiated by audio monitors. The quiet zones will be continuously optimized and dynamically adjusted covering a volume where the beneficial users or heads of beneficial users are located.

The acoustic quiet zone generators must provide the following three functions for free space interfaces: (1) directional and high fidelity acoustic pick-up devices of interference signals (e.g. microphones), (2) distributed acoustic emitters (e.g. array of speakers or transducers), and (3) multiple sensors (e. g. acoustic probes or microphones) in a quiet zone.

Noise source pickups may be through in situ microphones or via microphone arrays. The embedded microphones will pick-up noise waveforms from localized individual noise sources or combinations of individual noise sources, while microphone arrays will have multiple acoustic beams focused individually to localized noise sources or directions of incoming interference signals. In situ microphones such as the recently invented MEM micro-phones may tie to various strategically identified locations at close proximity to a user on a structure or in air where acoustic noises propagating through. For example, to cancel selected engine noises from multiple engines on a commercial aircraft for a passenger but not voices or music from the public announcement systems, preferred locations for noise sampling shall be areas very closed to the passenger. Thus, concurrent acoustic noise samples will be collected and processed for the selections of engine noises to be used in the cancellation loops.

The cancellation techniques generating quiet zones shall be applicable for acoustic waves. However, there are significant differences in processing, which must take the following into consideration:

1. Almost all acoustic waves in audible frequency range are longitudinal waves.

2. Required processing structures must be altered to account for relative percentage bandwidths.
   a. Information is in acoustic wave under direct modulation without carriers.

3. Dispersive natures on propagation especially multipath effects.
   a. Various frequency components via different propagation paths.

SUMMARY OF THE INVENTION

The present invention relates to architectures and methods of generating acoustic quiet zones by injection of acoustic cancellation signals, comprising the following three functions: (1) directional and high fidelity acoustic pick-up devices of interference signals (e.g. microphones), (2) distributed acoustic emitters (e.g. array of speakers or transducers), and (3) multiple sensors (e. g. acoustic probes or microphones) in a quiet zone. The sensors and acoustic pickup devices pick up acoustic signals, both the aggregate noise as well as the undesired signals for cancellation. These acoustic signals are then sent to an electronic processing unit, where the cancellation signals are filtered and "injected" via the acoustic emitters back into the quiet zones to cancel out selected noises.

Acoustic Pick up Devices

Noise source pickups may be through in situ microphones or via microphone arrays. The embedded microphones will pick-up noise waveforms from localized individual noise sources or combinations of individual noise sources, while microphone arrays will have multiple acoustic beams focused individually to localized noise sources or directions of incoming interference signals.

In situ microphones such as the recently invented MEM micro-phones may tie to various strategically identified locations at close proximity to a user on a structure or in air where acoustic noises are propagating. For example, to cancel selected engine noises from multiple engines on a commercial aircraft for a passenger but not voices or music from the public announcement systems, preferred locations for noise sampling shall be areas very close to the passenger. Thus, concurrent acoustic noise samples will be collected and processed for the selections of engine noises to be used in the cancellation loops.

The microphone array may be configured and programmed to feature various acoustic reception beam patterns such as an omni-directional pattern, directional spot, near-field spot, or a directional with shaped-contour acoustic beams. There may be many concurrent beams, picking-up noises from an isolated noise sources or aggregated noises from a group of distributed sources, such as noises from an automobile engine. The microphone array may also be distributed to pick up various aggregated noises concurrently from the distributed sources but at different pickup angles or locations.

Each of the input beams are aiming for a major acoustic noise or interference source. On the other hand, multiple strong external acoustic interference signals often reduce hearing sensitivities of a user; such as (1) aircraft engine noises to the passengers in a commercial airliner carbine, (2) tire-and-road friction noises from four wheels of a passenger car on a road, and (3) distributed engine block noises of a passenger car. This invention also relates to mitigation architectures and designs of acoustic injection-for-cancellation processing against multiple strong external acoustic interferences and noises.

Acoustic Emitting Devices

As to frequency responses, individual emitters must radiate but may not be uniformly responsive to all acoustic signals over the entire audible spectrum. The associated optimization processing will automatically pre-compensate for the non-uniformities of an individual emitter. It may also be possible of dividing the noise signals to be injected by an emitter into multiple overlapped sub-bands, each of which is radiated by an individually frequency optimized speaker or transducer.

As to their spatial resolutions, controlled noise emissions and injections are through arrays of speakers or transducers. The emitting devices organized as a distributed acoustic injection array will inject processed noise waveforms to a localized coverage for reductions of intensity levels of selected noises. The injection array features multiple beams injecting various selected and processed noises into the same area but with different amplitude and phase distributions on injected noises. Same processed noises may be equivalently injected from different subsets of a distributed array with proper time delays and phase distributions emulating multipath effects of acoustic noises. Furthermore, it may be possible of dividing the noise signals into multiple overlapped subbands; each to be radiated, individually by frequency optimized speaker or transducer arrays.

Acoustic Probes for Diagnostic Network

Diagnostic probes are used as an important portion of quiet zone generation processing; a close loop optimization process. They continuously measure the flux density or power levels of noise in a quiet zone aggregated from original noises and those injected by the injection arrays. The measured data are fed-back and processed for minimizations of aggregated noises by iteratively updating the amplitude and phase weighting of elements across audible spectrum in acoustic injection arrays The diagnostic probes may be through in situ microphones or via microphone arrays. The in situ microphones will measure local power levels at a sampling location in the quiet zone, or power levels of combined signals from various sampling locations. On the other hand, microphone arrays near the quiet zones will have multiple acoustic beams focused individually to localized sub-zones in the quiet zones. The covered sub-zones by various beams may be overlapped, but the union of the sub-zones must cover the intended quiet zones.

In situ microphones such as the recently invented MEM micro-phones may be used to independently measure power levels at a sampling location, or to measure power levels of integrated fields from multiple sampling locations.

The microphone array near the quiet zone, on the other hand, may be configured and programmed to feature various acoustic reception beam patterns; such as omni-directional, directional spot, near-field spot, or directional with shaped-contour acoustic beams. There may be many concurrent beams, picking-up aggregated noises from an isolated sampling point or aggregated noises from a group of distributed sampling points. The microphone array may also be distributed to pick up various aggregated noises concurrently from the distributed sampling locations; each with unique weighting factors.

Accordingly, an embodiment of present invention provides acoustic noise mitigation techniques against selected strong external noises.

An embodiment of the invention discloses functions of the acoustic injection arrays with a feedback loop are to minimize undesired acoustic signals iteratively by dynamically updating the amplitudes and phases weightings, or equivalents, of individual elements in the acoustic injection array. The weightings of all elements are the components of a vector referred as a "cancellation weighting vector" or a CWV. The inputs to the acoustic injection arrays are from pickup ports, microphones placed adjacent to noise sources or strategic locations to pick up the identified noise signals. The feedback loop to the injection arrays features many diagnostic probes, which are distributed in and/or around the quiet zones and will be used to measure the strengths of combined acoustic interference signals. An optimization processor in the feedback loop converts the measurements from each probe into performance indexes; which are called cost functions and must be positively "definited". The summation of the all cost functions is referred as the total cost of the current performance measure for the acoustic injection arrays. The to-be-updated weights in the next iteration for individual elements of the acoustic injection arrays are calculated based on the gradient of the performance measurements by an optimization algorithm, iteratively minimizing the total cost.

Another embodiment of the present invention discloses functions of the injection arrays with a feedback loop to minimize undesired acoustic signals from external sources iteratively by dynamically updating the amplitudes and phases weightings, or equivalents, of individual elements in the injection array. The weightings of all elements in an injection array are the components of a vector referred as a "cancellation weighting vector" or a CWV. The acoustic inputs to the injection arrays are from an array of microphones which are focused to select the undesired acoustic signals from external sources. The feedback loop to the injection arrays features many diagnostic probes, which are distributed in the quiet zones and will be used to measure strengths of combined undesired acoustic signals.

An optimization processor in the feedback loop converts measurements from each probe into performance indexes; which are called cost functions and must be positively "definited". The summation of the all cost functions is referred as the total cost of the current performance measure for the injection arrays. The to-be-updated weights for the next iteration of individual elements in the injection arrays are calculated based on the gradient of the performance measurements by optimization algorithms minimizing the total cost iteratively.

A third embodiment of the present invention discloses functions of the acoustic injection arrays with a feedback loop for personnel devices with multi-function capability, designed to minimize undesired acoustic noise signals, such as snores from adjacent sources iteratively by dynamically updating the amplitudes and phases weightings, or equivalents, of individual elements in the injection array. The snore noise may be from a person located right next to the user a bed room, or from persons on the next seats around a passenger in a cabin of commercial airliner.

The weightings of all acoustic injection array elements in an injection array are the components of a vector referred as a "cancellation weighting vector" or a CWV. The inputs to the acoustic injection arrays are from an array of pick-up microphones which selectively only pickups the undesired acoustic signals through directional acoustic beams pointed toward the corresponding sources. The feedback loop to the acoustic injection arrays features a few diagnostic probes which will be used to remotely measure the strengths of combined acoustic noise signals over the identified quiet zones, e.g. around the two ears of the user. These probes will be near the proximity of the quiet zones.

An optimization processor in the feedback loop converts measurements from each probe into performance indexes; which are called cost functions and must be positively definite. The summation of the all coat functions is referred as the total cost of the current performance measure for the injection arrays. The to-be-updated weights in the next iteration for individual elements of the injection arrays are calculated based on the gradient of the performance measurements by an optimization algorithm minimizing the total cost iteratively. At an optimized state after the iterative results converge, the resulting cost will be reduced significantly. Consequently, the acoustic noise signals, snore sounds, from the nearby noise sources are minimized over the quiet zones, e. g. reasonable space coverage within which two ears of the user will be. Therefore, the portable device will enable users to enjoy pleasant environment; free from the annoying acoustic noises originated from nearby sources.

A fourth embodiment of the present invention discloses functions of the acoustic injection arrays with a feedback loop are to minimize undesired signal strengths over limited regions of quiet zones iteratively by dynamically updating the amplitudes and phases weightings, or equivalents, of individual elements in the injection array. The undesired signals may be aggregated noise signals from distributed sources received by users in a passenger automobile. The undesired signals may also be aggregated audio signals which causing audio feedback from distributed speakers to microphones in a theater. The weightings of all elements in an injection array are the components of a vector referred as a "cancellation weighting vector" or a CWV.

The inputs to the acoustic injection arrays are from pick-up microphone arrays with multiple beams pointed toward individual nearby noise sources which only pickups selected undesired noise signals. Each of the pickup beams is followed by an acoustic digital beam forming network (DBFN). There will be M acoustic DNFN, each with a dynamic CWV, in the acoustic injection array. There will total N injection array elements for an acoustic injection array. Each CWV can have up-to N components. For the auto example, let us assume N=12.

The feedback loop to the injection arrays features Nd diagnostic probes located very near users in the quiet zones. The probes will be used to measure the combined strengths of undesired incoming acoustic noise signals from distributed noise sources and those from radiated by the acoustic injection array elements.

An optimization processor in the feedback loop converts measurements from individual probes into performance indexes; which are called cost functions and must be positively definite. The summation of all cost functions is referred to as the total cost of the current performance measure for the injection arrays. The to-be-updated weights in the next iteration for individual elements of the injection arrays are calculated based on the gradient of the performance measurements according to optimization algorithm. The optimization process minimizes the total cost iteratively. At a steady state after the iterative processing converges, the resulting cost will be reduced significantly. Consequently, the undesired incoming (cell phone) signals levels are significantly minimized over the quiet zones. Therefore, (cell phone) users in the quiet zone will not receive incoming signals with adequate RF signal levels to maintain physical links at all.

The probes, e. g. in situ MEM microphones, can be configured to measure power levels of selected noise signals at sampling locations individually, or to estimate the power levers over small areas within the identified quiet zone. These coverage areas consisting many sampling points may be mostly disjointed with small overlapped among one another. They may also be completely overlapped but with unique amplitude and phase weighting over the coverage areas.

BRIEF DESCRIPTION OF THE DRAWINGS

FIG. 8a illustrates conventional audio systems with microphones, audio amplifiers, and speakers. FIG. 8b illustrates the required additional instrumentation to perform injection-for-cancellation functions. FIG. 8a+8b illustrates the aggregate setup without the performer.

DETAILED DESCRIPTION OF THE PREFERRED EMBODIMENT

The proposed acoustic quiet zone generation technique features injection of the undesired acoustic noise at low power levels for cancellations. The noise mitigation technique comprises an auxiliary acoustic injection array with iterative processing to maintain a dynamic acoustic quiet zone over user-located areas.

Figure 1:
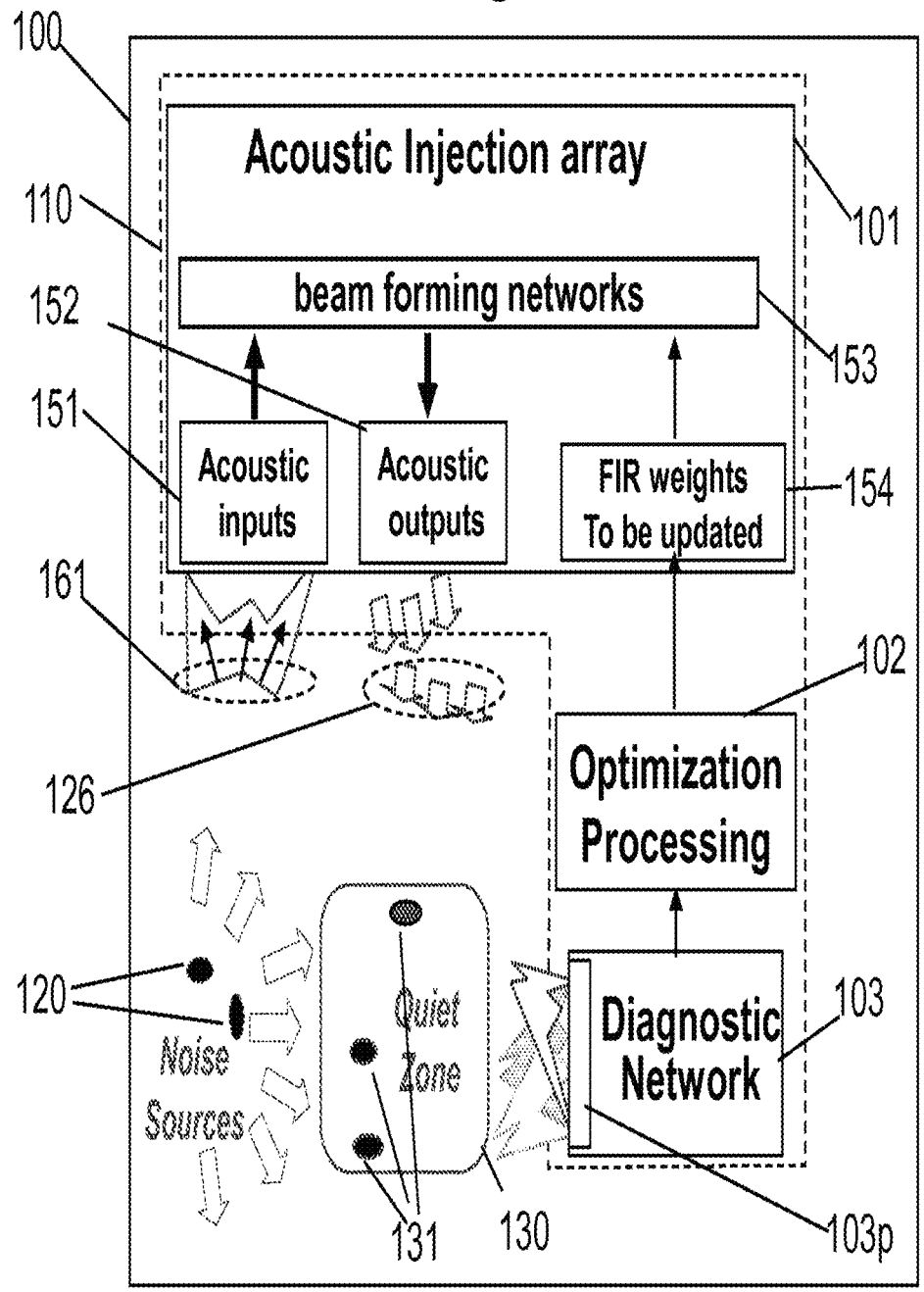
FIG. 1 illustrates a block diagram of architectures and methods of generating acoustic quiet zones via acoustic noise injection for cancellation according to an embodiment of the present invention. An auxiliary acoustic injection array, a diagnostic network, and an optimization processing are depicted accordingly.

FIG. 1 depicts the functional blocks of the acoustic signal cancellation apparatus (100). One such a design (110) features the following functions: (1) an acoustic Injection array (101), (2) optimization processing (102), and (3) diagnostic network (103).

Acoustic injection array (101) consists of (1) an array of pickup sensors as M acoustic inputs (151) to pick up acoustic noise signals from noise sources (120) in real time, (2) a beam forming network (BFN) (153) with an M-to-N distribution network, and (3) an array of N acoustic signal injectors (152). The M-to-N BFN (112), where M=number of acoustic inputs (151) and N=acoustic outputs (152), feature electronic weighting of amplitude and phase of various frequency components, or equivalent. The weightings are referred as cancellation beam weight vectors (CWVs) or simply beam weight vectors (BWVs). Each component of a CWV features a finite-impulse-response (FIR) filter. The dynamic coefficients of a FIR filter will alter the amplitudes and phases of different frequency components of the signals going through the filter.

Acoustic signal injectors (152) include signal conditioning and amplification mechanisms as well as acoustic radiating elements, e. g. speakers or transducers, and have repositioning capabilities, either mechanical or electronic.

Diagnostic probes (103p) and acoustic sensors of the diagnostic network (103), are mostly located either inside or at the proximity of the targeted quiet zones (130), over which beneficial users (131) are located. Outputs of the acoustic sensors are comprised of continuous measurements of any combination of diagnostic probes. We shall refer these measurements as observables. The diagnostic network measures the dynamic distributions of the identified acoustic signals strengths via the probes over the quiet zone, then converts them into performance indexes for comparison to desired or referenced distribution of acoustic signals strengths.

Each observable is associated with a performance index or a cost function; which is positively definited number. The summation of all cost functions is the total cost, which is also positive definite. Total cost is a measurement index indicating the "distance" between the current system performances to that of the desired system performance. When the current performances meet the desired ones, the total cost shall be below a predetermined small positive threshold value.

Based on the total cost from the diagnostic network (103), optimization processor (102) will continuously calculate or measure the current gradient of total cost, and convert them into updated CWVs. The components of CWVs in the form of FIR weights (154) will be output to buffers for the updates in a new clock cycle. Alterations in the FIR weights in the BFN (153) dynamically controls radiation patterns of the acoustic injection array (101), generating cancellation noise signals from identified noise sources (120) into the quiet zone.

Quiet zones (130) free from identified noise signals over limited areas are generated by dynamically controlled injections of the identified acoustic noise signals through an acoustic injection array (101) with acoustic injection elements (152) distributed near the proposed quiet zone (130) of recipient users (131).

The pickup array (151) selects and picks up undesired jamming or acoustic signals via its configurable reception patterns (161) toward noise sources, or via its directional discrimination capability, picking-up strong noise signals within its field of view (FOV). The M picked-up noise signals are fed to the BFN (153), in which each input is individually replicated into N-injection channels and then weighted separately with CWVs controlled by the optimization processor (102).

In each of the N injection acoustic channels, there are M weighted acoustic noise signals summed together as an injection channel signal for an individual interference injector (152). These signals are conditioned and amplified, and then radiated by the injection array (152) as controlled acoustic noise waves (126) to reach the quiet zones (150). As a result, the aggregated noise distributions in quiet zones (150) are from the noise sourced directly, and from the controlled noise radiations injected from the acoustic injection array (101).

Figure 2:
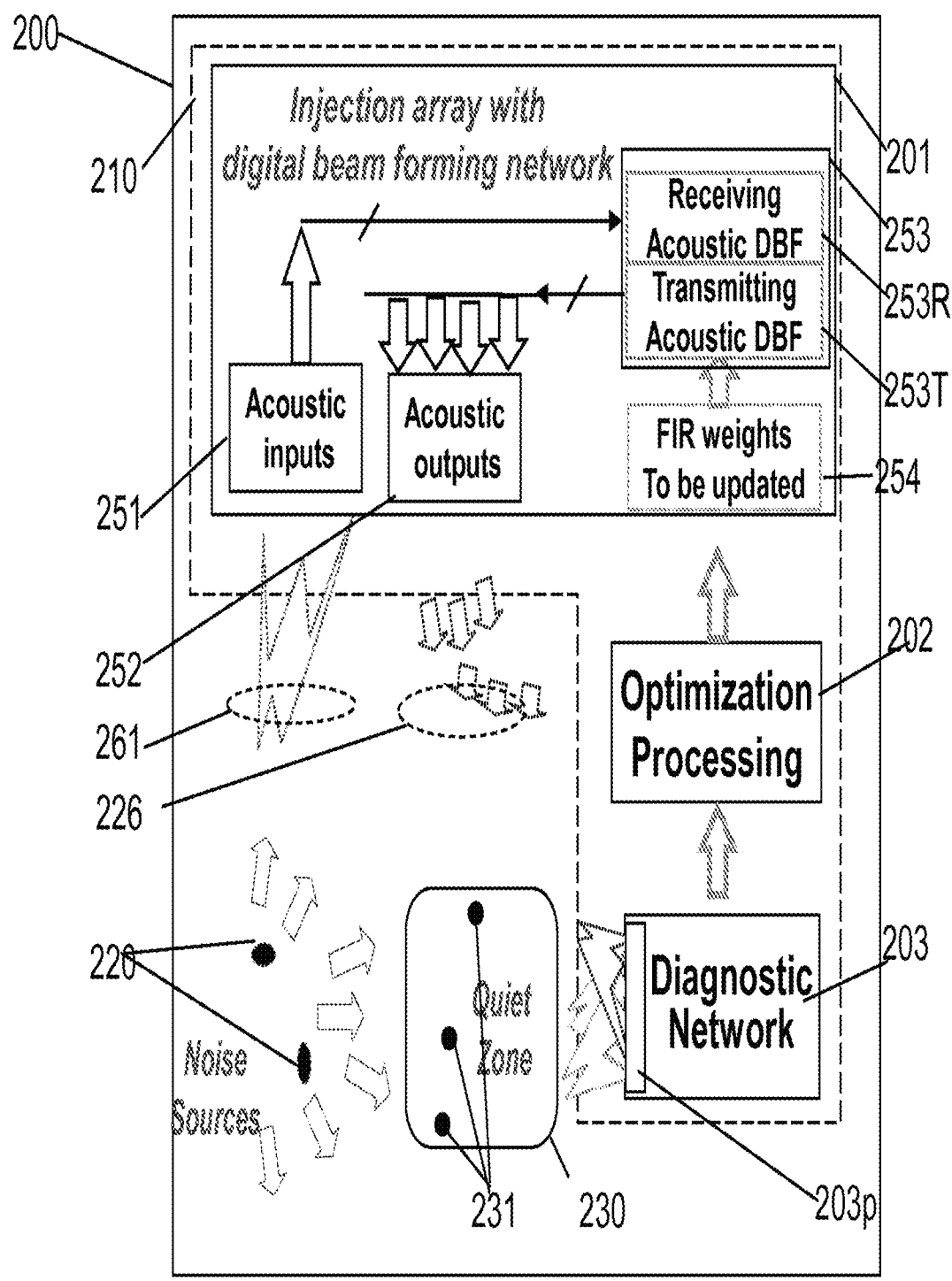
FIG. 2 illustrates an alternative embodiment of present invention, with an auxiliary acoustic injection array, a diagnostic network, and an optimization processing depicted accordingly. There are two sets of digital beam forming (DBF) networks: one for picking up identified noise sources and the other for controlled injections of identified noises. Each of the receive beam features at least one acoustic transmit DBF.

FIG. 2 depicts another implementation method for cancellation scheme (110) in FIG. 1. There is one major difference: an implementation of the functions of BFN (153)

illustrated in the block (253) consisting of functions of receive-side (Rx) acoustic digital beam forming network (DBFN) (253R) and those of transmit-side (Tx) BFN (253T).

FIG. 2 depicts the functional blocks of the injection for cancellation apparatus (200). One such a design (210) features the following functions; (1) an acoustic Injection array (201), (2) optimization processing (202), and (3) diagnostic network (203).

Acoustic injection array (201) consists of an array of pickup sensors as acoustic inputs (251) for real-time pickup of acoustic signals (220), (2) beam forming network (BFN) (253) with a M-to-N distribution network, where M=number of acoustic inputs (151) and N=acoustic outputs (152), and (3) acoustic signal injectors (252). BFN (253) is divided into two separated beam forming functions: receiving acoustic DBF (253R) and transmitting acoustic DBF (253T). Both feature electronic weighting of amplitude and phase of various frequency components, or equivalent, for each of its M inputs of the Rx DBF (253R) or N outputs of the Tx DBF (253T).

The weightings for a beam generated by the Rx DBF (253R) are referred as beam weight vectors (BWV). Each component of a BWV features a finite-impulse-response (FIR) filter. The coefficients of various FIR filters for a BWV will be optimized and then fixed. As a result, the input acoustic beam is pointed to identified acoustic noise sources featuring proper weighting on amplitudes and phases of different frequency components. Various input acoustic beams can be programmed and configured individually to point to different noise sources, fixed or moving.

The weightings for the Tx DBF (253T) are referred as cancellation beam weight vectors (CWVs). Each component of a CWV features a finite-impulse-response (FIR) filter. The dynamic coefficients of a FIR filter will alter the amplitudes and phases of different frequency components of the signal.

Acoustic signal injectors (252) include signal conditioning and amplification mechanisms as well as acoustic radiating elements, e. g. speakers or transducers. For example, an input array features 2 input beams using 4 input microphones and each beam is associated with 10 output speakers; i.e. M=4, P=2, and N=10. In this configuration there will be 2*4 FIR filters in the Rx DBF (253R) processor, and 2*10 FIR filters in the Tx DBF (253T) processor.

Diagnostic probes (203$p$), acoustic sensors of the diagnostic network (203), are located either inside or at the proximity of the targeted quiet zones (230), over which recipient users (231) are located. Outputs of the acoustic sensors are comprised of continuous measurements of any combination of diagnostic probes. The outputs of acoustic sensors are referred as observables. The diagnostic network measures the dynamic distributions of the identified acoustic signals strengths via the probes over the quiet zone, and then converts them into performance indexes for comparison to desired or referenced distribution of acoustic signals strengths.

Each observable is associated with a performance index or a cost function; which is positive "definited." Total cost, the summation of all the cost functions, is an index for determining indicating how large the "distance" is between the current system performances to that of the desired system performance. When the current performances meet the desired ones; the total cost shall be below a predetermined small positive threshold value.

Based on the total cost from the diagnostic network (203), the optimization processor (202) will continuously calculate or measure the current gradient of total cost with respect to CWVs. The updated CWVs are derived from the gradient accordingly based on steepest descent algorithms. The components of CWVs in the forms of FIR weights will be output to buffers (254) for the updates in a coming clock cycle. It is the alterations in the FIR weights in the transmitting acoustic DBF (253T) which dynamically control radiation patterns of the acoustic injection array (201) cancelling noise signals from identified noise sources (220) in the quiet zone (230), Acoustic quiet zones (230) free from identified noise signals over limited areas are generated by dynamically controlled injections of the identified acoustic noise signals through an acoustic injection array (201) with injection elements (252) distributed nearby the quiet zone (230) of users (231).

Acoustic pickup array (251) selects and picks up undesired noise signals via its configurable reception patterns (261) or via its directional discrimination capability, picking-up strong noise signals within its field of view (FOV). The M picked-up noise signals are fed to the Rx acoustic DBFN (253R), in which each signal is individually replicated into P-beam channels and then weighted separately with BWVs controlled by the optimization processor (202). P must be a positive integer.

In each of the N acoustic injection channels, there are P weighted acoustic noise signals summed together as an injection channel signal for individual acoustic noise signal injector (252). These signals are conditioned and amplified, and then radiated by the injection array (252) as controlled acoustic noise waves (226) to reach the quiet zones (250). As a result, the aggregated noise distributions in the quiet zones (250) are from the noise sourced directly, and from the controlled noise radiations injected from the acoustic injection array (201).

Figure 3:
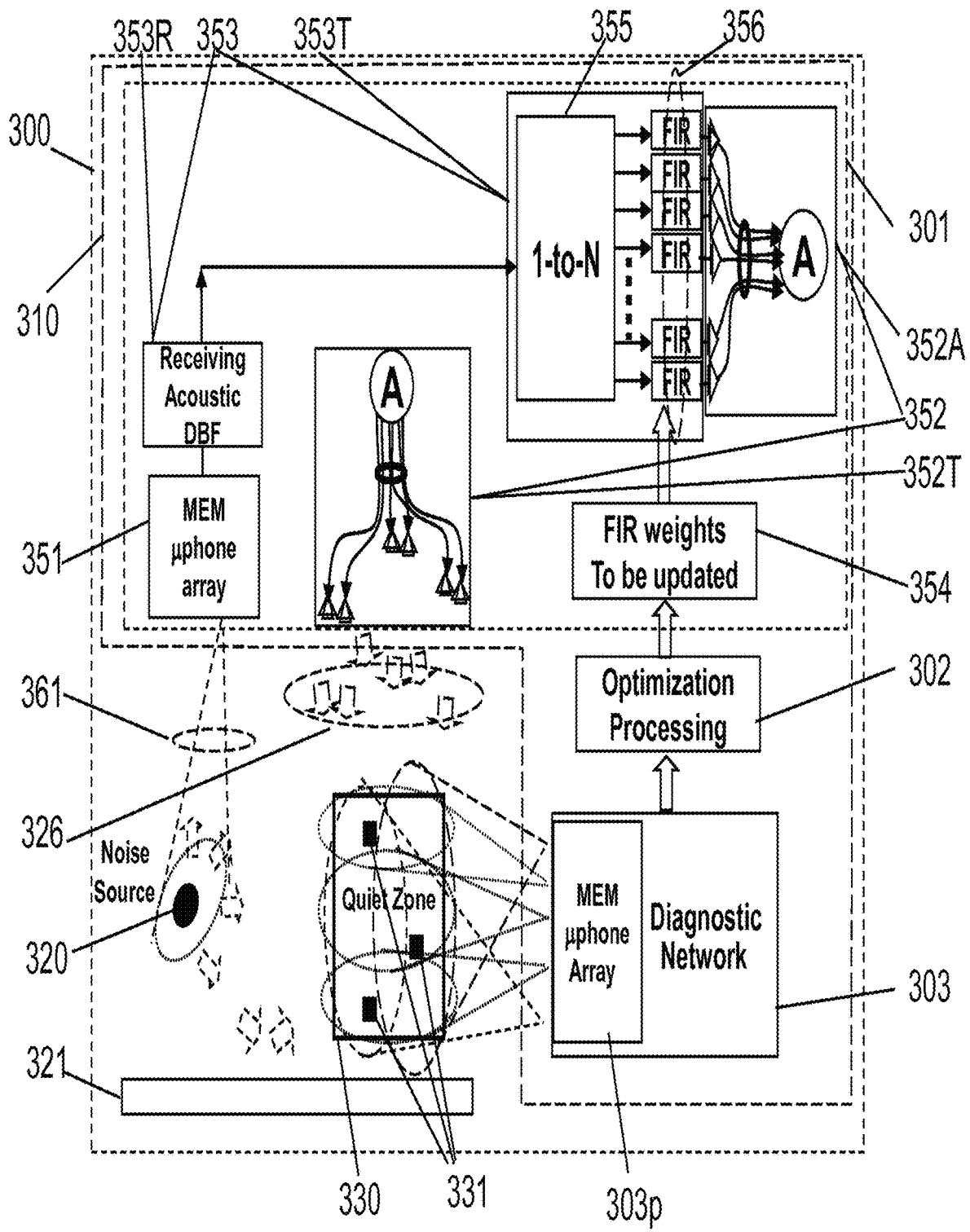
FIG. 3 illustrates another alternative embodiment of the present invention for snore mitigation. An auxiliary transmit (Tx) array, a diagnostic network, and an optimization processing are depicted accordingly.

FIG. 3 depicts one implementation method for the functional blocks of the injection for cancellation techniques (100) against a selected fixed noise source in FIG. 1 for other applications such as personal devices for snore cancellation. The functional blocks of the injection for cancellation techniques (300) are illustrated. One such a design (310) features the following functions; (1) an acoustic Injection array (301), (2) optimization processing (302), and (3) diagnostic network (303).

An acoustic injection array consists of: (1) an array of MEM microphones as M acoustic inputs (351) to pick up acoustic noise signals from an identified noise source (320) in real time, (2) a beam forming network (BFN) (353) with a 1-to-N distribution network (355), and (3) an array of N distributed acoustic signal injectors (352) situated near the user. The transmitting (Tx) DBFN (353T) features a 1-to-N divider or replicator (355) and N FIR filters (356) performing electronic weighting of amplitude and phase of various frequency components. The weightings for the Tx DBF (353T) are referred as cancellation beam weight vectors (CWVs). Each component of a CWV features a FIR filter (356), and its associated dynamic coefficients will alter the amplitudes and phases of different frequency components of the signals going through it.

The acoustic signal injectors (352) include signal conditioning and amplification mechanisms (352A) as well as acoustic radiating elements (352T), e. g. speakers or transducers, and may have optional re-positioning capability for some radiating elements (352T).

Diagnostic probes (303$p$), which are acoustic sensors of the diagnostic network (303), are implemented by MEM microphone array mostly located either inside or at the proximity of the targeted quiet zones (330), over which the recipient users (331) are located. Outputs of acoustic sensors are multiple acoustic diagnostic beams (339) for continuous measurements of overlapped coverage areas. While individual coverage of diagnostic beams are smaller than the quiet zone (330), and largely overlap with other diagnostic beams, the aggregate coverage is sufficiently covers quiet zone (330) entirely. Diagnostic network (303) measures the dynamic distributions of the identified acoustic signals strengths via probes (303p) over the quiet zone (330). Outputs of the acoustic sensors, referred to as observables, are comprised of continuous measurements of any combination of fixed and/or dynamic diagnostic probes. The observables are then converted into performance indexes in the diagnostic network (303) for comparison to desired or referenced distribution of acoustic signals strengths.

Each observable is associated with a performance index or a cost function; which is positive "definited." Total cost, the summation of all the cost functions, is an index indicating how large the "distance" between the current system performance and desired system performance. When the current performance meets desired values, the total cost shall be below a predetermined small positive threshold value.

Based on the total cost from the diagnostic network (303), optimization processor (302) will continuously calculate or measure the current gradient of total cost with respect to CWVs. Updated CWVs are derived from the gradient accordingly based on steepest descent algorithms. The components of CWVs in the forms of FIR weights will be output to electronic buffers (354) for the updates in the next clock cycle. Alterations in the FIR weights in the acoustic DBF (353) dynamically control radiation patterns (326) of the acoustic injection array (301), cancelling noise signals from the identified noise source (320) in the quiet zone (330), The quiet zones (330) over limited areas are generated through destructive interference of: 1) Noises generated directly from noise source (320), or 2) noises reflected by structure (321), by dynamically controlled injection of acoustic signals from the same noise source (320) through an acoustic injection array (301).

Pickup array (351) selects and picks up undesired noise signals via its configurable reception patterns (361). The M picked-up noise signals are fed to a Rx acoustic DBF (353R), and are amplitude- and phase-weighted by a BWV controlled by the optimization processor (302).

Similarly, in the N injection acoustic channels, the same acoustic noise signal stream is weighted by various components of a CWV for individual acoustic injectors (352). These signals are conditioned and amplified (352A), then radiated by injection array (352) as controlled acoustic noise waves (326) for cancellation of undesired noise in quiet zone (330).

Figure 4:
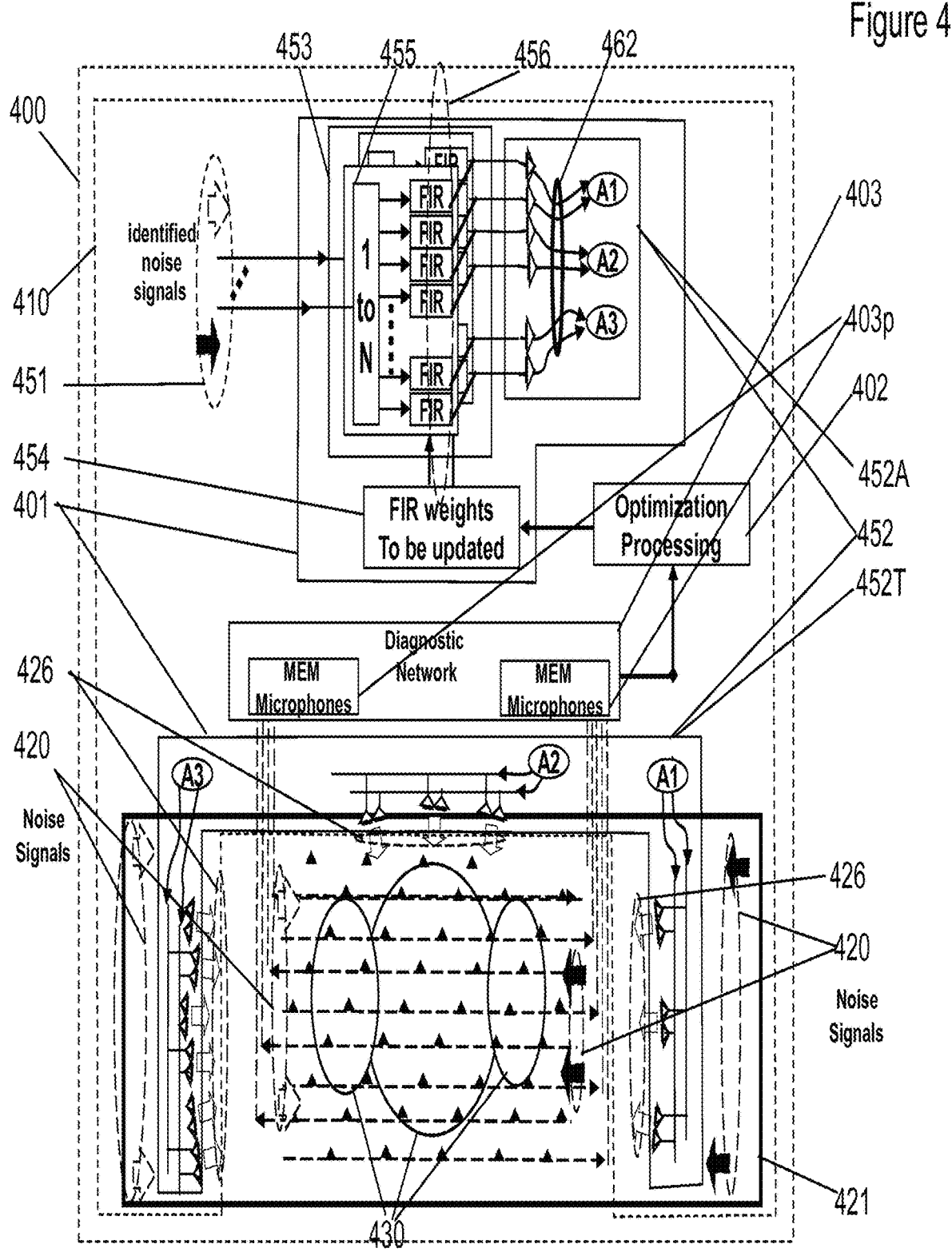
FIG. 4 illustrates a block diagram of an architecture and method of generating acoustic quiet zone free from multiple identified noise sources via injection of the very signals from the noise sources for cancellation over a finite area or volume of space according to an embodiment of the present invention. An auxiliary Tx array, a diagnostic network, and an optimization loop are depicted accordingly.

FIG. 4 depicts another implementation method for the functional blocks of the injection for cancellation techniques (100) against multiple known noise signals in FIG. 1. For applications in passenger cabins of airliners, high speed trains, or passenger cars, the cancellation instrumentations are implemented into passenger seats. Quiet zones (430) are generated, covering parts of head rest areas (421) of a passenger seat.

The functional blocks of the injection for cancellation techniques (400) are illustrated. One such a design (410) comprises the following: (1) an acoustic Injection array (401), (2) optimization processing (402), and (3) diagnostic network (403).

An acoustic injection array consists of: (1) an array of M acoustic inputs (451) for picking up any combination of acoustic noise from identified sources (420) in real time, (2) beam forming network (BFN) (453) with M sets of DBFs (453), and (3) an array of N distributed acoustic signal injectors (452). Each of the DBF (453) features a 1-to-N distribution network (455) and N FIR filters (456), performing electronic weighting of amplitude and phase of various frequency components. The weightings for the DBF (453) are referred to as cancellation beam weight vectors (CWVs), with each component of a CWV featuring a FIR filter (456). The dynamic coefficients of a FIR filter (456) will alter the amplitudes and phases of different frequency components of the signals being filtered (456).

Acoustic signal injectors (452) include signal conditioning and amplification mechanisms (452A) as well as acoustic radiating elements (452T), e. g. speakers or acoustic transducers.

Diagnostic probes (403p), acoustic sensors of the diagnostic network (403), are implemented by MEM microphone array, distributed in or around quiet zones (430), where users are located. Outputs of acoustic diagnostic sensors are organized via multiple strings, each continuously measuring aggregated noise power levels from contributions of attached acoustic probes. Coverage of individual strings of diagnostic sensors are smaller than the quiet zone, while collectively cover the quiet zones (430) many times over. Outputs of the acoustic sensors, referred to as observables, are comprised of continuous measurements of any combination of fixed and/or dynamic diagnostic probes. The diagnostic network measures the dynamic distributions of the identified acoustic signals strengths via diagnostic probes (403p) over the quiet zone, and then converts them into performance indexes in comparison to the desired or referenced distribution of acoustic signals strengths.

Each observable is associated with a performance index or a cost function; which is positive "definited." The total cost, the summation of all cost, and also positive definited, is an index for indicating how large the "distance" between the current system performance to that of the desired system performance. When the current performances meet the desired ones; the total cost shall be below a predetermined small positive threshold value.

Based on the total cost from the diagnostic network (403), the optimization processor (402) will continuously calculate or measure the current gradient of total cost with respect to CWVs. Updated CWVs are derived from the gradient accordingly based on steepest descent algorithms. The components of CWVs in the forms of FIR weights will be output to buffers (454) for updates in the next clock cycle. Alterations in the FIR weights (456) in the acoustic DBF (453) dynamically control radiation patterns (426) of the acoustic injection array (401), cancelling noise signals from the identified noise source (420) in the quiet zone (430).

The quiet zones (430) free from noises generated by the identified source over limited areas are generated by dynamically controlled injection of acoustic signals from the identified source through an acoustic injection array (401) with injection elements (452) distributed nearby the quiet zone (430) of beneficial users.

The M known noise signals (451) are individually fed to M acoustic DBF (453), where each signal is then replicated into N-channels and weighted accordingly. As a result, there are M*N weighted channels, which are divided and then aggregated into N output channels (462). Each output channel (462) features a unique linear combination of M known noise signals. These signals (462) are conditioned and amplified by filters and amplifiers (452A), and then radiated by the injection array elements (452T) as controlled acoustic noise waves (426) to quiet zones (450). As results, the aggregated noise distributions in the quiet zones (430) are from the noise sourced directly, from those reflected by structures, and from the controlled noise radiations injected from the acoustic injection array (401).

Figure 5:
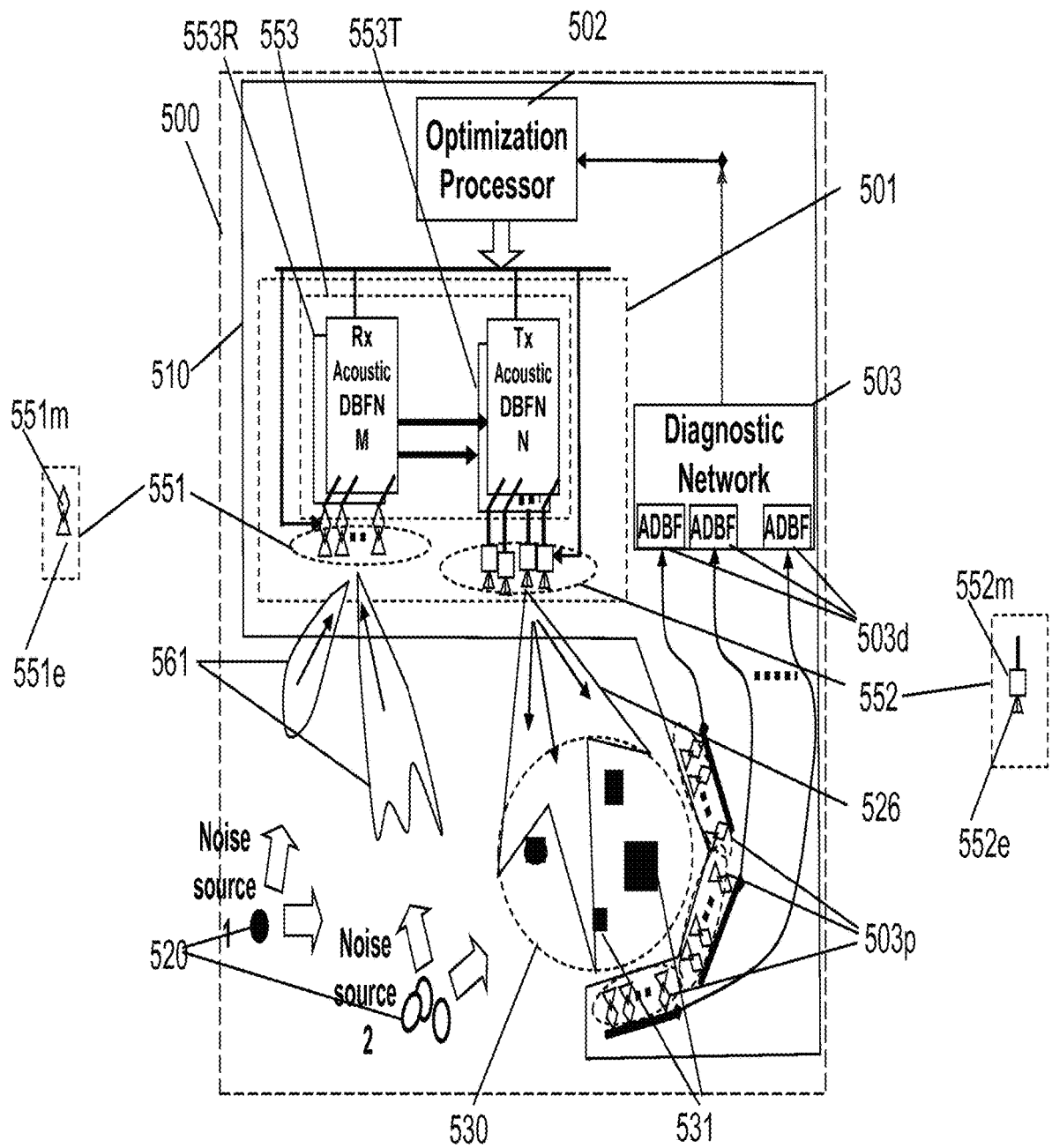
FIG. 5 illustrates a block diagram of architecture and method of portable instruments generating quiet zone via injection of acoustic noise signals for cancellation over an identified quiet zone according to an embodiment of the present invention. An auxiliary Tx array, a diagnostic network, and an optimization loop are depicted accordingly. The inputs of the injection arrays are through arrays of microphones, and the outputs are through arrays of transducers or speakers. The weight updating for both receiving microphone arrays and those for transmit acoustic arrays is via element repositioning and/or amplitude and phase variations.

FIG. 5 depicts another implementation method for the functional blocks of the injection for cancellation techniques (100) against acoustic noises from multiple sources in FIG. 1. The noise sources may either be directional or distributed. In addition, there are two major differences. Firstly, optimization processing controls the element repositioning mechanisms (551m and 552m) of: 1) injection radiation array elements (552) and 2) noise pick-up array elements (551). Secondly, diagnostic networks consist of distributed diagnostic probe arrays (503p) with multiple acoustic digital beam forming networks or ADBF (503d), and the MEM microphones (503p) may be shared with the hardware of the noise pickup arrays (551)

FIG. 5 depicts the functional blocks of the injection for cancellation techniques (500). One such a design (510) features the following functions; (1) an acoustic Injection array (501), (2) optimization processing (502), and (3) diagnostic network (503).

The acoustic injection array consists of an array of pickup sensors as M acoustic array elements (551) to pick up acoustic noise signals from noise sources (520) in real time, (2) a beam forming network (BFN) (553) with a M-to-N distribution network, and (3) an array of N acoustic signal injectors (552). The M-to-N BFN (553) is divided into two separated beam forming functions: receiving acoustic DBF (553R) and transmitting acoustic DBF (553T). Both feature electronic weightings of amplitude and phase of various frequency components, or equivalent, for each of its M inputs of the Rx DBF (553R) or N outputs of the Tx DBF (553T). Furthermore, array elements in both the pickup and the injecting arrays are equipped with re-positioning mechanisms (517M and 519M), which will be a part of dynamic beam forming processing.

The weightings for a beam generated by the Rx DBF (553R) are referred as a beam weight vectors (BWV). Each component of a BWV features a finite-impulse-response (FIR) filter. The coefficients of the various FIR filters for a BWV will be optimized and then fixed. As a result, the input acoustic beam is pointed at acoustic noise sources featuring proper weighting on amplitudes and phases of different frequency components. Various input acoustic beams can be programmed and configured individually to point to different fixed noise sources, or slow moving noise sources through coefficient altering of FIR filters or re-positioning of array elements.

The weightings for the Tx DBF (553T) are referred as cancellation beam weight vectors (CWVs). Each component of a CWV features a finite-impulse-response (FIR) filter. The dynamic coefficients of a FIR filter will alter the amplitudes and phases of different frequency components of the signals going through the filter.

The acoustic signal injectors (552) include signal conditioning and amplification mechanisms as well as acoustic radiating elements (552e), e. g. speakers or transducers, with re-positioning mechanisms (552m). For example, an input array featuring 2 input beams using 4 input microphones means each beam is associated with 10 output speakers; i.e. M=4, P=2, and N=10. In this configuration there will be 2*4 FIR filters in the Rx DBF (553R) processor, and 2*10 FIR filters in the Tx DBF (553T) processor.

Diagnostic probes (503p) and acoustic sensors of the diagnostic network (503) are located in or around targeted quiet zones (530), where users (531) are located. The distributed probes (503p) with re-positioning mechanisms (552m) are grouped to form multiple beams at various phase centers such that integrated radiation patterns covering similar areas will feature unique but different amplitude and phase responses at various positions in the quiet zone. These diagnostic beams are capable of dynamically changing their pointed positions and beam shapes via acoustic digital beam forming (ADBF) (503d) network.

Outputs of the acoustic sensors, referred to as observables, are comprised of continuous measurements of any combination of fixed and/or dynamic diagnostic probes (503p). The diagnostic network measures the dynamic distributions of the identified acoustic signals strengths via the probes in the quiet zone, then converts them into performance indexes for comparison to desired or referenced distribution of acoustic signals strengths.

Each observable is associated with a performance index or a cost function, which is positive "definited." The total cost; the summation of all cost and also positive definited, is an index for indicating how large the "distance" between the current system performance to that of the desired system performance. When the current performances meet the desired ones; the total cost shall be below a predetermined small positive threshold value.

Based on the total cost from the diagnostic network (503), the optimization processor (502) will continuously calculate or measure the current gradient of total cost with respect to CWVs and/or positions of array elements. Updated CWVs and/or re-positioning information ($\Delta X$) are derived from the gradient accordingly based on steepest descent algorithms. The components of CWVs in the forms of FIR weights, and/or repositioning vectors (X) for individual array elements will be used for the updating in a coming clock cycle. Iterative alterations of the FIR weights and/or the continuous perturbations of element positions in the transmitting acoustic DBF (553T) dynamically control radiation patterns of the acoustic injection array (501), cancelling noise signals from identified noise sources (520) in the quiet zone (530), The quiet zones (530) free from identified noise signals over limited areas are generated by dynamically controlled injection of the identified acoustic noise signals through an acoustic injection array (501) with injection elements (552) distributed nearby the quiet zone (530) of users (531).

Pickup array (551) selects and picks up undesired noise signals via its configurable reception patterns (561) toward noise sources or via its directional discriminations capability picking-up strong noise signals within its field of view (FOV). The M picked-up noise signals are fed to the Rx acoustic DBFN (553R), where each signal is individually replicated into P-beam channels and then weighted separately with BWV controlled by the optimization processor (502). P must be a positive integer.

In each of the N acoustic injection channels, there are P weighted acoustic noise signals summed together as an injection channel signal for an individual acoustic noise signal injector (552). These signals are conditioned and amplified, then radiated by the injection array (552) into quiet zones (550) as controlled acoustic noise waves (526). Thus, the aggregated noise distributions in the quiet zones (550) are from the noise sourced directly and from the controlled noise radiations injected from the acoustic injection array (501).

Figure 6:
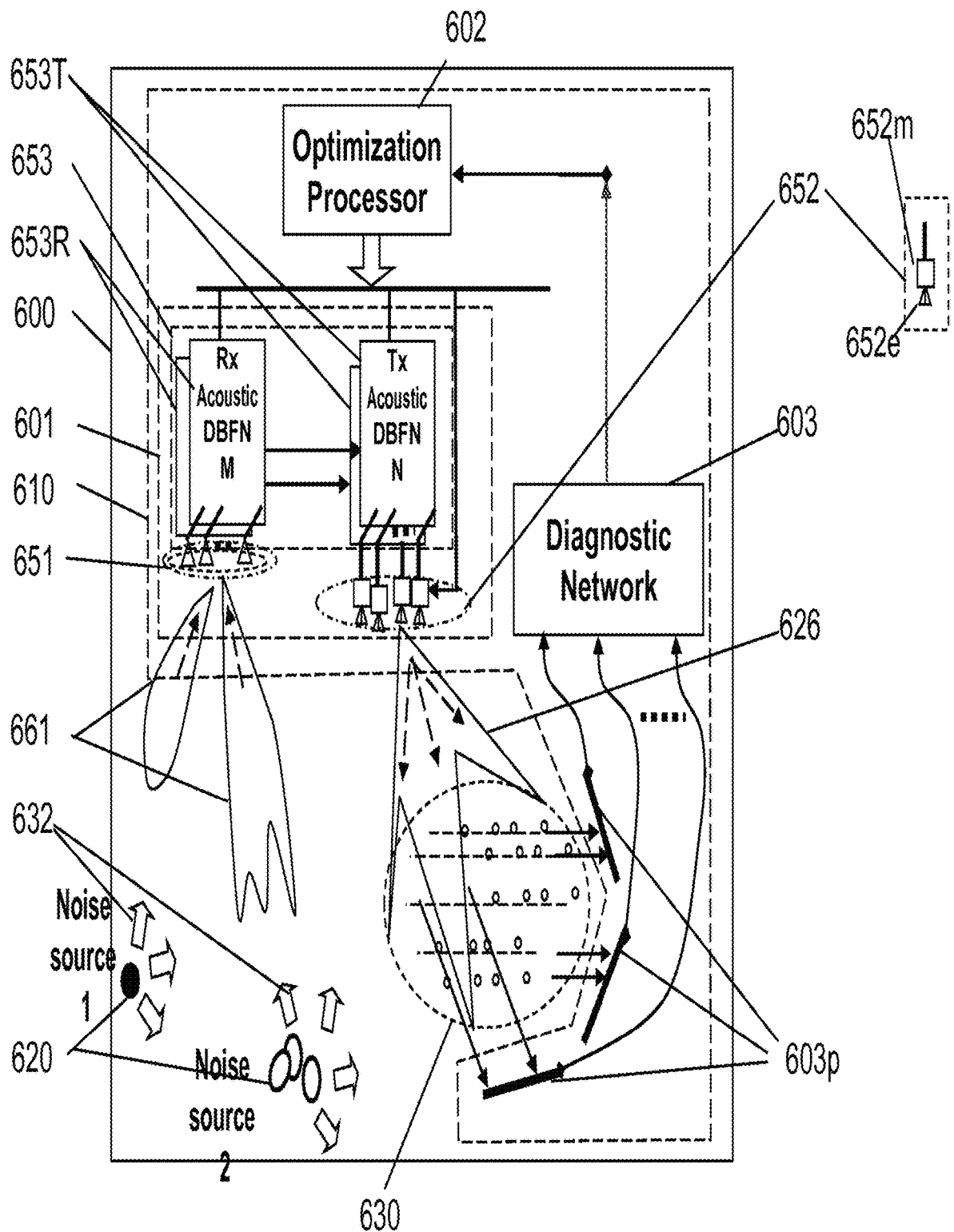
FIG. 6 illustrates a block diagram of architecture and method of portable instruments generating quiet zone via injection of acoustic noise signals for cancellation overran identified quiet zone according to an embodiment of the present invention. An auxiliary Tx array, a diagnostic network, and an optimization loop are depicted accordingly.

FIG. 6 depicts the functional blocks of the injection for cancellation techniques (600) against acoustic noises from multiple sources. One such a design (610) features the following functions; (1) an acoustic Injection array (601), (2) optimization processing (602), and (3) diagnostic network (603).

There are six major features. 1) Pickup array (651) with M-elements is used for multiple (p) beams (661) to track multiple noise sources (620). The noise sources may be either directional or distributed. 2) Each pickup beam (661) is formed by a M-to-1 Rx acoustic DBFN (653R). 3) Each pickup beam is also associated with a 1-to-N Tx acoustic DBFN (653T). 4) There are N acoustic injection array elements (652). 5) Optimization processing occurs via multiple loops:
  a. Rx DBFNs (653R) are optimized by altering BWVs for best reception of individual signals of identified noise sources (620), or equivalent;
  b. Tx DBFNs (653T) are optimized by altering CWVs; and
  c. Tx injection element repositioning mechanisms (652*m*) are for altering field distributions of identified noise signals in quiet zones (630).
6) Diagnostic probes (603*p*) are fixed and grouped into multiple strings distributed in the quiet zone (630).

Acoustic injection array (601) consists of: (1) an array of pickup microphones as M acoustic array elements (651) to pick up undesired acoustic noise signals from noise sources (620) in real time, (2) a beam forming network (BFN) (610) with a M-to-N distribution network, and (3) an array of N acoustic signal injectors (652). The M-to-N BFN (610) is divided into two separated beam-forming functions: Rx acoustic DBFN (653R) and Tx acoustic DBFN (653T). Both feature electronic weighting of amplitude and phase of various frequency components, or equivalent, for each of the M inputs of the Rx DBFN (653R) or N outputs of the Tx DBFN (635T). Furthermore, array elements in the injecting arrays are equipped with re-positioning mechanisms (652*m*), which will be a part of dynamic beam forming processing.

The weightings for beams generated by the Rx DBFN (653R) are referred to as beam weight vectors (BWV). Each component of a BWV features a finite-impulse-response (FIR) filter. The coefficients of various FIR filters for a BWV will be optimized and fixed. As a result, input acoustic beams are pointed to acoustic noise sources featuring proper weighting of amplitudes and phases of different frequency components. The various input acoustic beams can be programmed and configured individually to point to fixed or moving noise sources by FIR filter coefficient alteration.

The weightings for the Tx DBFN (653T) are referred as cancellation beam weight vectors (CWVs). Each component of a CWV features a FIR filter. The dynamic coefficients of a FIR filter will alter the amplitudes and phases of different frequency components of the signals going through the filter. The acoustic signal injectors (652) include signal conditioning and amplifications mechanisms as well as acoustic radiating elements, e. g. speakers or transducers, with re-positioning capabilities.

For example, an input array features 2 input beams using 4 input microphones and each beam is associated with 10 output speakers; i.e. M=4, P=2, and N=10. In this configuration there will be 2*4 FIR filters in the Rx DBFN (653R) processor, and 2*10 FIR filters in the Tx DBFN (653T) processor.

Diagnostic probes (603*p*), acoustic sensors of the diagnostic network (603), are located either inside or at the proximity of the targeted quiet zones (630), where beneficial users are located. The distributed probes (603*p*) are grouped and connected by multiple strings. Outputs of the acoustic sensors, referred to as observables, are comprised of continuous measurements of any combination of fixed and/or dynamic diagnostic probes (603*p*). The diagnostic network measures the dynamic distributions of the identified acoustic signals strengths via the probes over the quiet zone, then converts them into performance indexes in comparison to desired or referenced distribution of acoustic signals strengths.

Each observable is associated with a performance index or a cost function; which is positive "definited." The total cost; the summation of all costs, also positive definited, is an index indicating how large the "distance" between the current system performance to that of the desired system performance. When the current performances meet the desired ones, the total cost shall be below a predetermined small positive threshold value.

Based on the total cost from the diagnostic network (603), the optimization processor (602) will continuously calculate or measure the current gradient of total cost with respect to CWVs and/or positions of array elements. The updates of the CWVs and/or re-positioning information ($\Delta X$) are derived from the gradient accordingly based on steepest descent algorithms. The components of CWVs in the forms of FIR weights, and/or repositioning vectors (X) for individual array elements will be used for the updating in a coming clock cycle. Iterative alterations in the FIR weights and/or the continuous perturbations of element positions in the Tx acoustic DBFN (653T) dynamically control radiation patterns of the acoustic injection array (601), cancelling noise signals from identified noise sources in the quiet zone (630).

Quiet zones (630) free from identified noise signals over limited areas are generated by dynamically controlled injection of the identified acoustic noise signals through an acoustic injection array (601) with injection elements (652) distributed nearby the quiet zone (630) of beneficial users.

Pickup array (651) selects and picks up undesired noise signals via its configurable reception patterns (661). The M picked-up noise signals are fed to the Rx acoustic DBFN (653R), where each is individually replicated into P-beam channels and then weighted separately with BWV controlled by the optimization processor (602). P must be a positive integer.

In each of the N injection acoustic channels, there are P weighted acoustic noise signals summed together as an injection channel signal for an individual acoustic noise signals injector (652). These signals are conditioned and amplified, and then radiated by the injection array (652) as controlled acoustic noise waves (626) to reach quiet zones (650). As a result, the aggregated noise distributions in the quiet zones (650) are from the noise sourced directly, and from the controlled noise radiations injected from the acoustic injection array (601).

Figure 7:
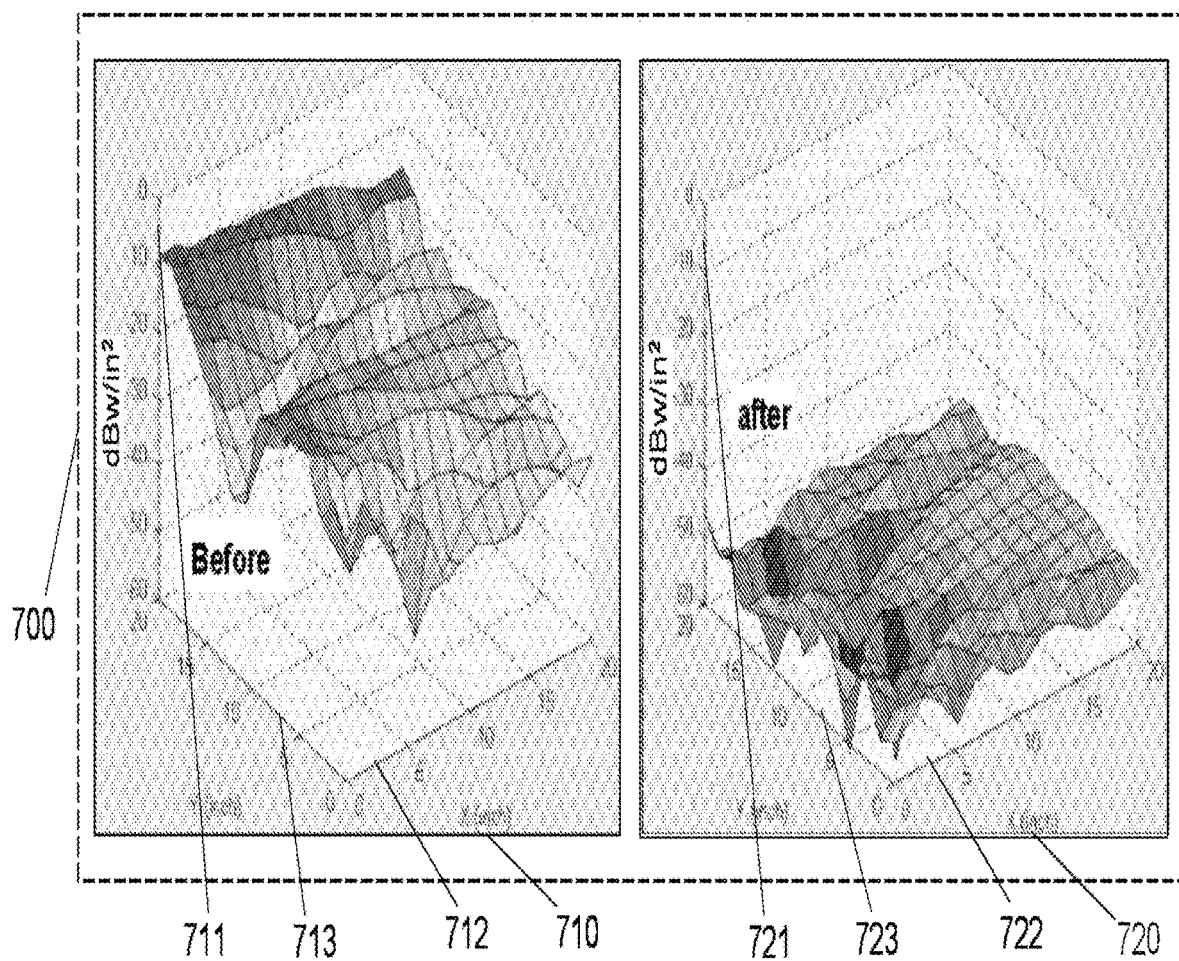
FIG. 7 illustrates the simulated noise distributions of quiet zone generation via the noise injection technique for electromagnetic (EM) noise signals; (a) a noise flux density distribution over the quiet zone before the noise injection processing, and (b) the noise flux density distribution after the noise injection processing.

FIG. 7 illustrates the simulated noise distributions (700) of quiet zone generation via the noise injection technique according to an embodiment of the present invention, illustrating: (a) a noise flux density distribution over the quiet zone before noise injection processing (710), and (b) the noise flux density distribution after noise injection processing (720).

Graph (710) depicts the noise flux density distribution over the quiet zone before the noise injection processing, the vertical axis (z-axis) (711) indicates flux density in the dimension of (decibel watt) dBw per inch squared. The x-axis (712) and the y-axis (713) indicate the area of a quiet zone; 20">x>0", and 20">y>0". The noise flux densities over the quiet zone before the injection—for cancellation process are ranged between −9 to −30 dBw/int.

As illustrated, the noises originate from a source at y>20" and x<0" and flowing toward the −y direction and +x direction slightly.

Graph (720) depicts the noise flux density distribution over the quiet zone after noise injection processing, with the vertical axis (z-axis) (721) indicating flux density in the dimension of dBw per inch squared. The x-axis (722) and the y-axis (723) indicate the area of a quiet zone; 20">x>0", and 20">y>0". The noise flux densities over the quiet zone after the injection—for cancellation process are all near or below −50 dBw per inch squared, with nearly uniformly distributed residue noises over the entire quiet zone.

The noise levels over the quiet zone have improved better than 20 dBw/$in^2$ near (x=20", y=0") and 40 dB near (x=0 and y=20") by the injection for cancellation processing. The data indicates reductions of noise power over the quiet zone better than 25 dB in maximum levels and ~30 dB in mean values.

Figure 8A:
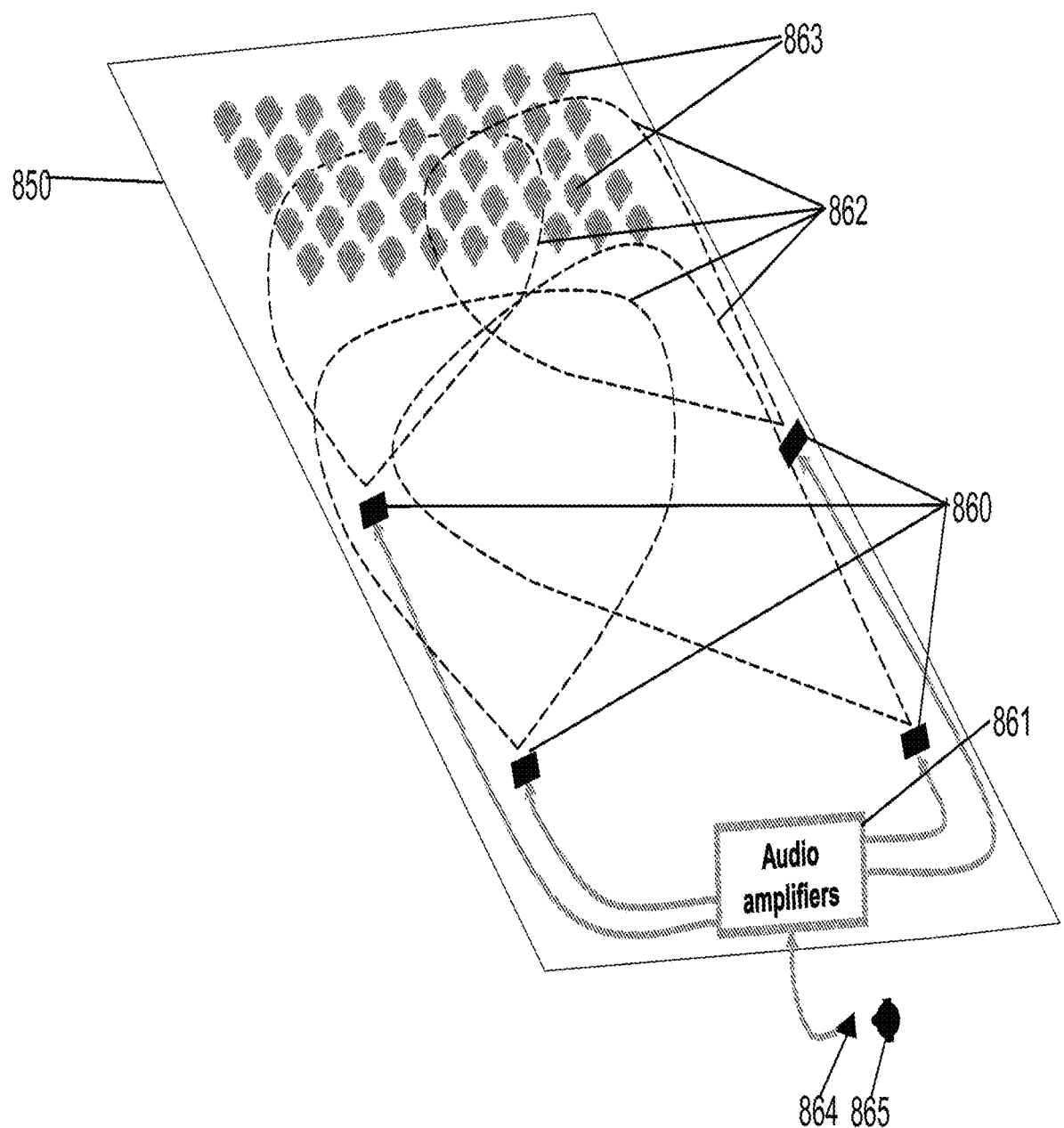
FIG. 8a, FIG. 8b, FIG. 8a+8b, and FIG. 8 collectively illustrate block diagrams of architecture and methods and instruments of generating quiet zone via injection of audio signals for cancellation over an identified quiet zone eliminating audio feedback in an audio amplification system for a small theater. According to an embodiment of the present invention, an audio Tx array (or an array of audio monitors), a diagnostic network, and an optimization loop are depicted accordingly.
Figure 8B:
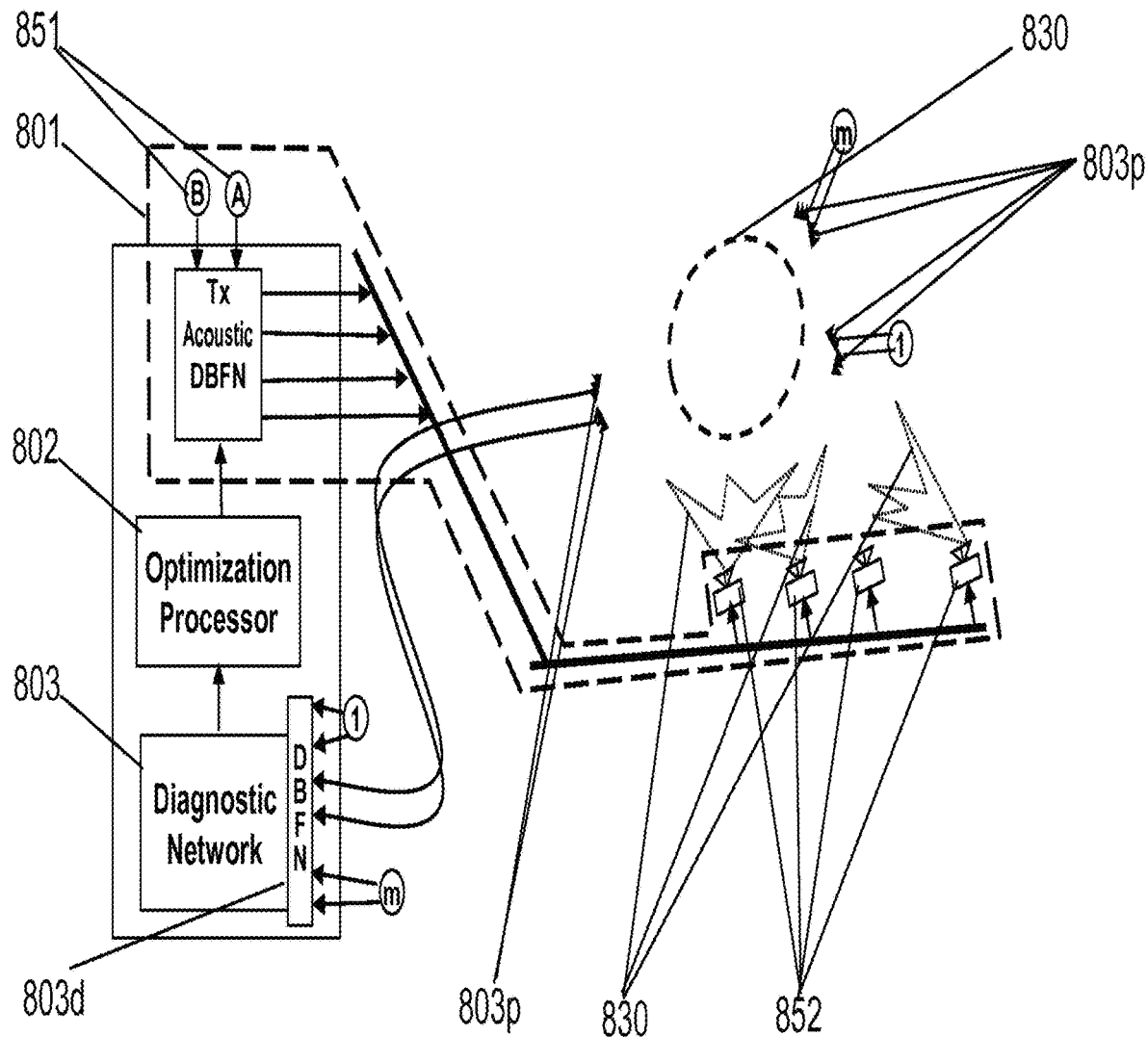
Figures 8A, 8B:
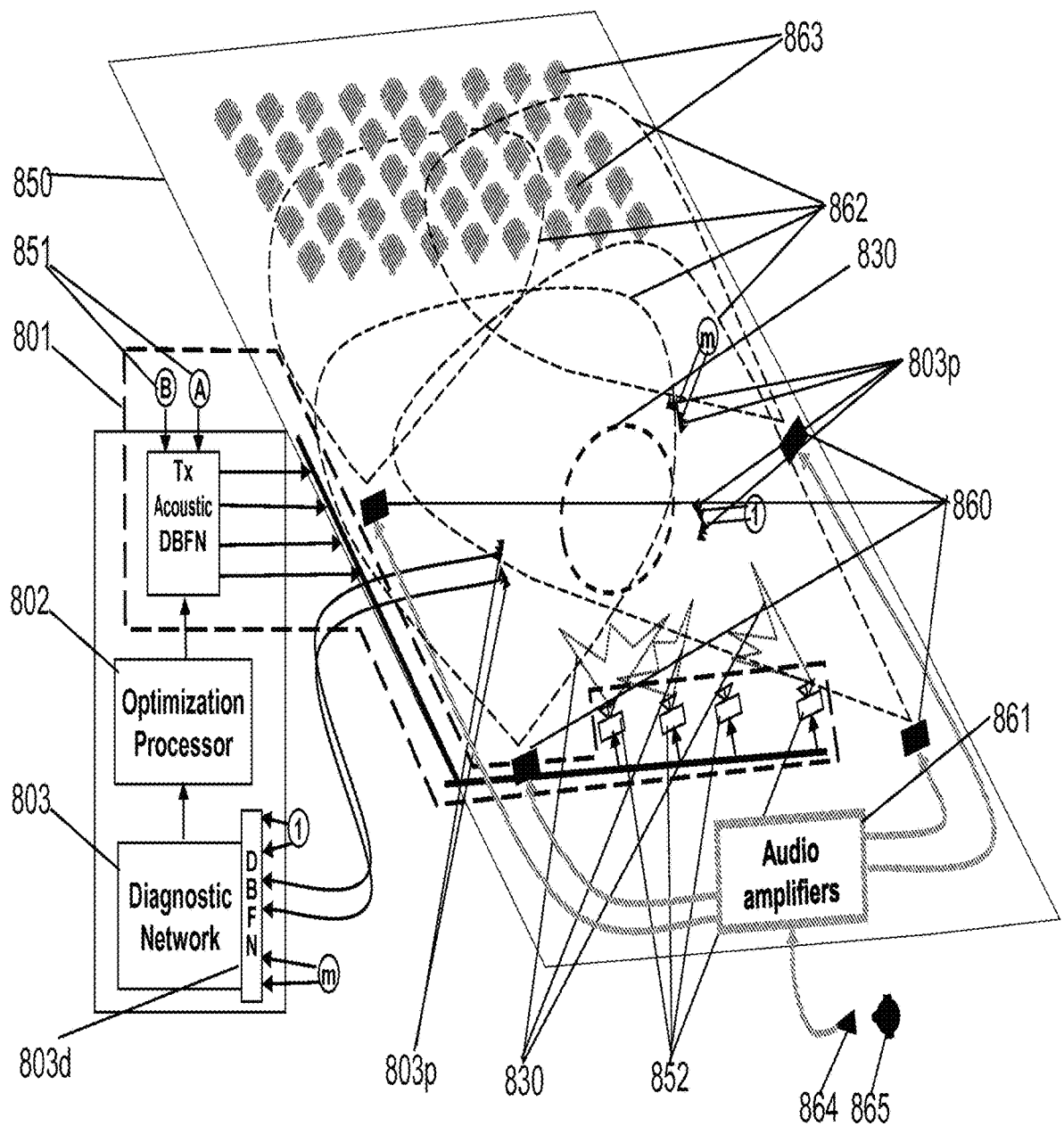

FIGS. 8a, 8b, 8a+8b, and 8 collectively illustrate block diagrams of architectures and methods of generating quiet zones via injection of audio signals for cancellation over an identified quiet zone. In particular, the goal is to eliminate audio feedback in an audio amplification system for a theater according to an embodiment of the present invention. An audio Tx array (or an array of audio monitors) (801), an optimization loop (802), and a diagnostic network (803) are depicted accordingly.

FIG. 8a illustrates conventional audio systems in a theater (850) with microphones (864), audio amplifiers (861), and speakers (860). Signal source (865) broadcast acoustic signals for distribution by speakers (860), delivering amplified audio signals via radiation patterns to a recipient audience (863).

FIG. 8b depicts the functional blocks of additional instrumentation for the injection-for-cancellation techniques against audio feedback signals in the quiet-zone (830) from multiple main speakers. The cancellation apparatus comprises the following: (1) an audio Injection array (801), (2) optimization processing (802), and (3) diagnostic network (803).

FIG. 8a+8b depicts conventional theater audio systems (850) and the functional blocks of additional instrumentation for the quiet zone techniques against audio feedback signals in the quiet-zone (830) from multiple main speakers.

Figure 8:
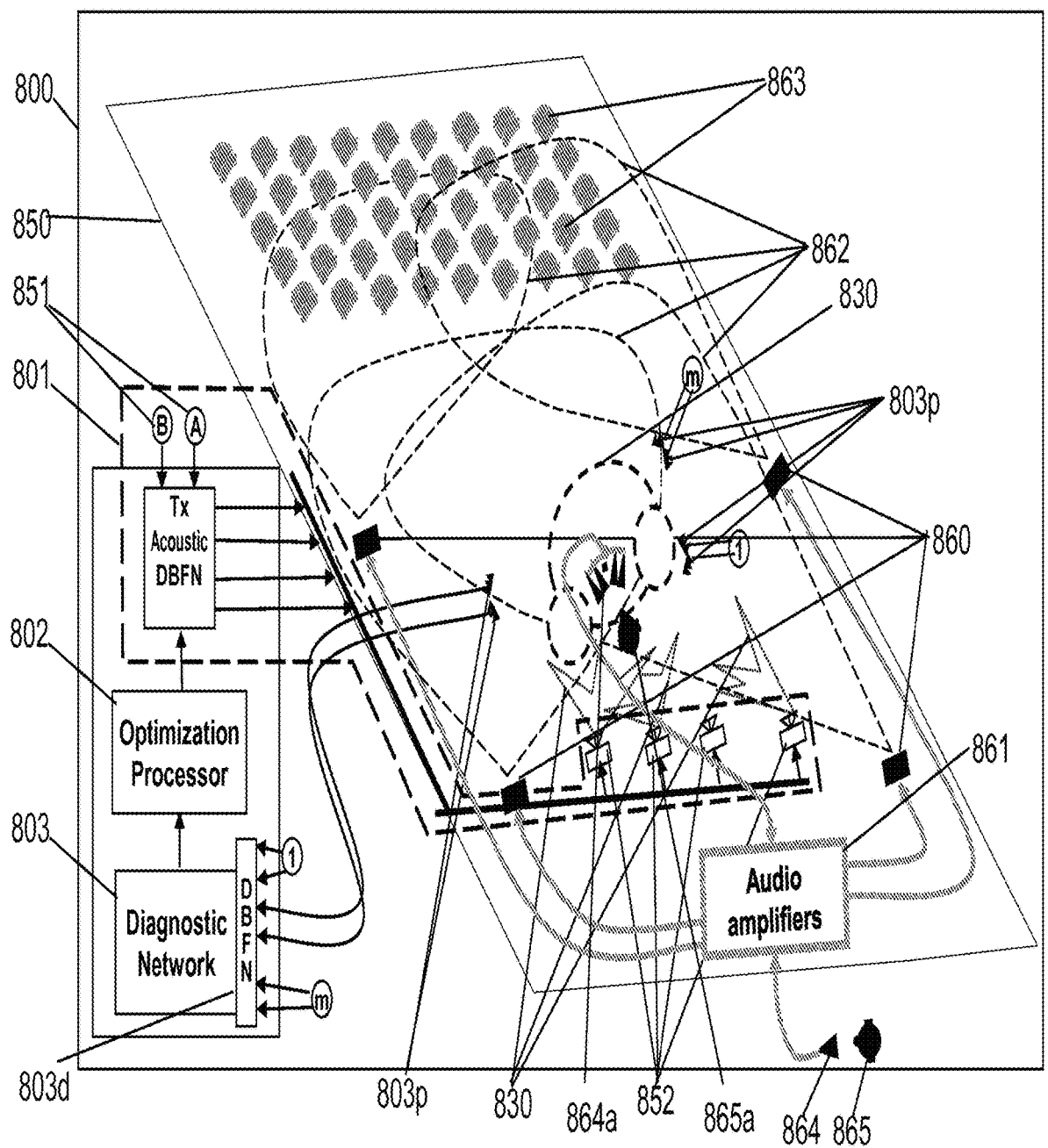
FIG. 8 illustrates the same combinations as that of FIG. 8a+8b, except with the performer onstage.

FIG. 8 depicts a performing artist (865a) on stage of a theater (850) featuring a dynamic audio quiet-zone (830) around the microphones, generated with audio systems augmented by the injection-for-cancellation techniques against audio feedback signals from multiple main speakers.

There are five major features. 1) Multiple audio pickups (851) directly feed into multiple audio channels of the audio amplifier (861). 2) Each pickup is also associated with a 1-to-N Tx acoustic DBFN (853T). 3) There are N audio injection array elements (or audio monitors) (852). 4) Optimizations are processed via multiple loops:
 a. Tx DBFNs (853T) alter CWVs;
 b. Tx injection element repositioning mechanisms (852m) are for altering audio field distributions of identified feedback signals in quiet zones (830).
5) Diagnostic probes (803p) are fixed and grouped into multiple strings distributed in the quiet zone (830).

An audio injection array (801) consists of (1) an array of M pickups (851) for amplified audio signals from main amplifiers (861) in real time, (2) M transmit (Tx) digital beam forming network (Tx DBFN) (853T) each with a 1-to-N distribution network, and (3) an array of N audio signal injectors or audio monitors (652). The 1-to-N Tx DBFNs (853T) feature electronic weighting of amplitude and phase of various frequency components, or equivalent, for N outputs. Furthermore, array elements are equipped with re-positioning mechanisms (852m).

The weightings for the Tx DBFN (853T) are referred as cancellation beam weight vectors (CWVs). Each component of a CWV features a FIR filter. The dynamic coefficients of a FIR filter will alter the amplitudes and phases of different frequency components of the signals going through the filter. The audio signal injectors (852) include signal conditioning and amplifications mechanisms as well as audio radiating elements, e.g. speakers or transducers, with re-positioning capability for some radiating elements.

For example, an array of 2 input channels is associated with 10 output speakers; i.e. M=2, and N=10. In this configuration there will be 2*10 FIR filters in the Tx DBFN (853T) processor.

The diagnostic probes (803p), acoustic sensors of the diagnostic network (803), are mostly located either inside or at the proximity of the targeted quiet zones (830), over which beneficial performing artists are located. The distributed probes (803p) are grouped and connected by multiple strings. Outputs of the acoustic sensors, referred to as observables, are comprised of continuous measurements of any combination of fixed and/or dynamic diagnostic probes (803p), even if these probes are on different strings.—The diagnostic network measures the dynamic distributions of the identified audio feedback signals strengths via the probes over the quiet zone, then converts them into performance indexes in comparison to desired or referenced distribution of acoustic signals strengths.

Each observable is associated with a performance index or a cost function; which is positive "definited." The total cost; the summation of all cost and also positive definited, is an index indicating how large the "distance" between the current system performance to that of the desired system performance. When the current performances meet the desired ones, the total cost shall be below a predetermined small positive threshold value.

Based on the total cost from the diagnostic network (603), the optimization processor (602) will continuously calculate or measure the current gradient of total cost with respect to CWVs and/or positions of array elements. Updated CWVs and/or re-positioning information (ΔX) are derived from the gradient accordingly based on steepest descent algorithms. The components of CWVs in the forms of FIR weights, and/or repositioning vectors (X) for individual array elements will be used for the updating in a coming clock cycle. Iterative alterations in the FIR weights and/or the continuous perturbations of element positions in the Tx acoustic DBFN (853T) dynamically control radiation patterns of the acoustic injection array (801) cancelling noise signals from identified noise sources in the quiet zone (830).

The quiet zones (830) free from identified noise signals over limited areas are generated by dynamically controlled injection of the identified acoustic noise signals through an acoustic injection array (801) with injection elements (852) distributed nearby the quiet zone (830) of beneficial users.

Pickup array (851) for the "undesired" audio signals are via its direct connections to the outputs from the audio amplifiers. The M picked-up signals are fed to M Tx DBFNs. In a Tx DBFN, the input stream is replicated into N channels and signal streams in various channels then weighted separately with a CWV controlled by the optimization processor (802).

In each of the N injection acoustic channels, there are M weighted audio signals summed together as an injection channel signal for an audio signal injector (852). These signals are conditioned and amplified, and then radiated by the injection array (852) to quiet zones (830) as controlled audio signal waves (830). Thus, the aggregated audio signal distributions in the quiet zones (850) are from the main speakers (860) directly, and from the controlled audio radiations injected from the audio injection array (801).

What is claimed is:

1. A system for generating and injecting acoustic interference signals to mitigate undesired acoustic noise over a target zone, comprising:
    a set of M pickup sensors for picking up acoustic noise signals from one or more noise sources in real time and generating M noise signals, M being an integer greater than 1;
    a beam forming network having beam weight vectors (BWVs) and coupled to the M pickup sensors, the beam forming network comprising a set of M acoustic beam forming modules, each of the M acoustic beam forming modules receiving a respective one of the M noise signals and generating N intermediate signals, N being an integer greater than 1, the N intermediate signals generated by each of the M acoustic beam forming modules being combined respectively with corresponding intermediate signals generated by remaining M minus 1 acoustic beam forming modules to generate N acoustic interference signals; and
    a set of N acoustic injectors coupled to the beam forming network for receiving, conditioning and amplifying the N acoustic interference signals, and injecting the N amplified acoustic interference signals over the target zone,
    wherein each of the M acoustic beam forming modules comprises a 1-to-N distribution network and N finite-impulse-response (FIR) filters having FIR weights as components of the BWVs and coupled to the 1-to-N distribution network, the 1-to-N distribution network transforming the respective one of the M noise signals into N signals, each of the N finite-impulse-response filters receiving a respective one of the N signals, performing weighting of amplitude and phase of frequency components of the respective one of the N signals and generating a respective one of the N intermediate signals, and
    wherein the BWVs are updated based on signal strengths at the target zone.

2. The system of claim 1 further comprising a diagnostic network, the diagnostic network comprising diagnostic probes placed at sampling locations at the target zone for measuring the signal strengths of selected acoustic signals at the sampling locations, the diagnostic network generating a plurality of cost functions based on the measured signal strengths, a total cost function being the sum of the cost functions.

3. The system of claim 2 further comprising an optimization module coupled to the diagnostic network, the optimization module receiving the total cost function and computing a current gradient of the total cost function based on the received total cost function and updating the BWVs for the beam forming network.

4. The system of claim 1, wherein each of the N acoustic injectors comprises a signal conditioning mechanism configured to condition the respective one of the N acoustic interference signals, an amplification mechanism configured to amplify the respective one of the N acoustic interference signals, and at least one acoustic radiating element configured to inject the respective one of the N acoustic interference signals over the target zone.

5. The system of claim 1, wherein the M pickup sensors are configured to have repositioning capabilities.

6. The system of claim 1, wherein the M pickup sensors are configured to have directional discrimination capability or configurable reception patterns or both.

7. The system of claim 1, wherein the N acoustic injectors are configured to have repositioning capabilities.

8. A method for generating and injecting acoustic interference signals to mitigate undesired acoustic noise over a target zone, the method comprising:
    providing a set of M pickup sensors configured to pick up acoustic noise signals from one or more noise sources in real time and generate M noise signals, M being an integer greater than 1;
    providing a beam forming network having beam weight vectors (BWVs) and coupled to the M pickup sensors, wherein providing the beam forming network comprises:
        providing a receiving acoustic beam forming module configured to receive the M noise signals and generate P beam signals, P being an integer greater than or equal to 1; and
        providing a transmitting acoustic beam forming module configured to receive the P beam signals and generate N acoustic interference signals, N being an integer greater than 1; and
    providing a set of N acoustic injectors coupled to the transmitting acoustic beam forming module, each of the N acoustic injectors being configured to receive a respective one of the N acoustic interference signals and inject the respective one of the N acoustic interference signals over the target zone,
    wherein providing the transmitting acoustic beam forming module comprises:
        providing P acoustic beam forming submodules configured to receive the P beam signals respectively, each of the P acoustic beam forming submodules comprising a 1-to-N distribution network and N finite-impulse-response (FIR) filters having FIR weights as components of the BWVs and coupled to the 1-to-N distribution network, the 1-to-N distribution network being configured to transform the respective one of the P beam signals into N signals, each of the N finite-impulse-response filters being configured to receive a respective one of the N signals and perform weighting of amplitude and phase of frequency components of the respective one of the N signals, and
    wherein the BWVs are updated based on signal strengths at the target zone.

9. The method of claim 8 further comprising:
    providing a diagnostic network that comprises diagnostic probes placed at sampling locations at the target zone, the diagnostic probes being configured to measure the signal strengths of selected acoustic signals at the sampling locations, the diagnostic network being configured to generate a plurality of cost functions based on the measured signal strengths, a total cost function being a sum of the cost functions.

10. The method of claim 9 further comprising:
    providing an optimization module coupled to the diagnostic network, the optimization module being configured to receive the total cost function and compute a current gradient of the total cost function based on the received total cost function and updating the BWVs for the beam forming network.

11. The method of claim 8, wherein providing the set of M pickup sensors comprises providing the M pickup sensors configured to have repositioning capabilities, and wherein providing the N acoustic injectors comprises providing the N acoustic injectors configured to have repositioning capabilities.

12. The method of claim 8, wherein providing the set of M pickup sensors comprises providing the M pickup sensors configured to have directional discrimination capability or configurable reception patterns or both.

13. The method of claim 8, wherein providing the set of N acoustic injectors comprises:
providing for each of the N acoustic injectors:
a signal conditioning mechanism configured to condition the respective one of the N acoustic interference signals;
an amplification mechanism configured to amplify the respective one of the N acoustic interference signals; and
at least one acoustic radiating element configured to inject the respective one of the N acoustic interference signals over the target zone.

14. A method for generating and injecting acoustic interference signals to mitigate undesired acoustic noise over a target zone, the method comprising:
providing a set of M pickup sensors configured to pick up acoustic noise signals from one or more noise sources in real time and generate M noise signals, M being an integer greater than 1;
providing a beam forming network having beam weight vectors (BWVs) and coupled to the M pickup sensors, wherein providing the beam forming network comprises:
providing a receiving acoustic beam forming module configured to receive the M noise signals and generate P beam signals, P being an integer greater than or equal to 1 and smaller than or equal to M; and
providing a transmitting acoustic beam forming module configured to receive the P beam signals and generate N acoustic interference signals, N being an integer greater than 1; and
providing a set of N acoustic injectors coupled to the transmitting acoustic beam forming module, each of the N acoustic injectors being configured to receive a respective one of the N acoustic interference signals and inject the respective one of the N acoustic interference signals over the target zone,
wherein providing the transmitting acoustic beam forming module comprises:
providing P transmitting acoustic beam forming submodules configured to receive the P beam signals respectively, each of the P transmitting acoustic beam forming submodules comprises a 1-to-N distribution network and N finite-impulse-response (FIR) filters having FIR weights as components of the BWVs and coupled to the 1-to-N distribution network, the 1-to-N distribution network being configured to transform the respective one of the P beam signals into N signals, each of the N finite-impulse-response filters being configured to receive a respective one of the N signals and perform weighting of amplitude and phase of frequency components of the respective one of the N signals, and
wherein the BWVs are updated based on signal strengths at the target zone.

15. The method of claim 14, wherein providing the set of M pickup sensors comprises providing the M pickup sensors configured to have directional discrimination capability or configurable reception patterns or both.

16. The method of claim 14, wherein providing the set of M pickup sensors comprises providing the M pickup sensors configured to have repositioning capabilities, and wherein providing the set of N acoustic injectors comprises providing the N acoustic injectors configured to have repositioning capabilities.

17. The method of claim 14 further comprising:
providing a diagnostic network that comprises diagnostic probes placed at sampling locations at the target zone, the diagnostic probes being configured to measure the signal strengths of selected acoustic signals at the sampling locations, the diagnostic network being configured to generate a plurality of cost functions based on the measured signal strengths, a total cost function being a sum of the cost functions.

18. The method of claim 17 further comprising:
providing an optimization module coupled to the diagnostic network, the optimization module being configured to receive the total cost function and compute a current gradient of the total cost function based on the received total cost function and updating the BWVs for the beam forming network.

19. The method of claim 14, wherein providing the receiving acoustic beam forming module comprises:
providing P receiving acoustic beam forming submodules, each of the P receiving acoustic beam forming submodules being configured to receive the M noise signals and comprising M finite-impulse-response filters and an M-to-1 distribution network coupled to the M finite-impulse-response filters, each of the M finite-impulse-response filters being configured to receive a respective one of the M noise signals and perform weighting of amplitude and phase of frequency components of the respective one of the M noise signals, the M-to-1 distribution network being configured to transform M outputs of the M finite-impulse-response filters into a corresponding one of the P beam signals.

20. The method of claim 14, wherein providing the set of N acoustic injectors comprises:
providing for each of the N acoustic injectors:
a signal conditioning mechanism configured to condition the respective one of the N acoustic interference signals;
an amplification mechanism configured to amplify the respective one of the N acoustic interference signals; and
at least one acoustic radiating element configured to inject the respective one of the N acoustic interference signals over the target zone.

* * * * *